United States Patent
Takahashi

(10) Patent No.: US 12,138,566 B2
(45) Date of Patent: Nov. 12, 2024

(54) FILTRATION APPARATUS AND FILTER WASHING METHOD THEREFOR

(71) Applicant: FUJI FILTER MANUFACTURING CO., LTD., Tokyo (JP)

(72) Inventor: Yuichi Takahashi, Tochigi (JP)

(73) Assignee: FUJI FILTER MANUFACTURING CO., LTD., Tokyo (JP)

( * ) Notice: Subject to any disclaimer, the term of this patent is extended or adjusted under 35 U.S.C. 154(b) by 470 days.

(21) Appl. No.: 17/630,817

(22) PCT Filed: Jun. 15, 2020

(86) PCT No.: PCT/JP2020/023358
§ 371 (c)(1),
(2) Date: Jan. 27, 2022

(87) PCT Pub. No.: WO2021/019937
PCT Pub. Date: Feb. 4, 2021

(65) Prior Publication Data
US 2022/0288510 A1    Sep. 15, 2022

(30) Foreign Application Priority Data
Jul. 31, 2019    (JP) ................ 2019-141543

(51) Int. Cl.
*B01D 29/64* (2006.01)
*B01D 29/23* (2006.01)
(Continued)

(52) U.S. Cl.
CPC ......... *B01D 29/6484* (2013.01); *B01D 29/23* (2013.01); *B01D 29/6446* (2013.01);
(Continued)

(58) Field of Classification Search
CPC ................ B01D 29/23; B01D 29/6446; B01D 29/6484; B01D 29/6492; B01D 29/668; B01D 29/682; B01D 29/688
See application file for complete search history.

(56) References Cited

U.S. PATENT DOCUMENTS

| 5,152,891 A | 10/1992 | Netkowicz et al. |
| 5,268,095 A | 12/1993 | Barzuza |

(Continued)

FOREIGN PATENT DOCUMENTS

| JP | S50-28374 U | 4/1975 |
| JP | H0647209 U | 2/1994 |

(Continued)

OTHER PUBLICATIONS

Office action for Japanese Patent Application No. 2019-141543 with translation, Dec. 27, 2022, 8 Pages.

(Continued)

*Primary Examiner* — Dirk R Bass
(74) *Attorney, Agent, or Firm* — Botos Churchill IP Law LLP

(57) ABSTRACT

A filtration apparatus includes: a cylindrical filter element formed in a cylindrical shape to filter a target fluid guided through an one end opening of the filter element in such a manner that the target fluid passes in a direction from an inside toward an outside of the filter element; a backwashing mechanism drawing the filtered fluid in a direction from the outside toward the inside of the filter element; a high-pressure washing mechanism injecting a high-pressure fluid so as to pass through the filter element in the direction from the inside toward the outside of the filter element; and a rotary drive mechanism rotating the backwashing mecha- (Continued)

nism and the high-pressure washing mechanism around an axial line of the filter element in an internal space of the filter element.

15 Claims, 18 Drawing Sheets

(51) Int. Cl.
*B01D 29/66* (2006.01)
*B01D 29/68* (2006.01)

(52) U.S. Cl.
CPC ......... *B01D 29/668* (2013.01); *B01D 29/682* (2013.01); *B01D 29/688* (2013.01)

(56) References Cited

U.S. PATENT DOCUMENTS 6,543,624 B1　4/2003　Geisbauer
6,959,818 B2　11/2005　Olson
2014/0366493 A1　12/2014　Takahashi
2016/0228801 A1*　8/2016　Takahashi ............ B01D 29/668
2019/0388808 A1　12/2019　Takahashi et al.

FOREIGN PATENT DOCUMENTS

JP　　2015104683 A　　6/2015
JP　　2017006876 A　　1/2017
WO　　2018216247 A1　　11/2018

OTHER PUBLICATIONS

International Preliminary Report on Patentability from corresponding International Application No. PCT/JP2020/023358 mailed Feb. 3, 2022 (5 pages).
Final Office Action for Japanese Patent Application No. 2019-141543, Jun. 6, 2023, 5 Pages.
The Extended European Search Report for European Patent Application No. 20845665.7 mailed Jun. 29, 2023, 24 Pages.
The International Search Report and The Written Opinion for PCT/JP2020/023358, Date of Mailing: Aug. 25, 2020.

* cited by examiner

FILTRATION APPARATUS AND FILTER WASHING METHOD THEREFOR

CROSS-REFERENCE TO RELATED APPLICATION

The present application is a national phase entry under 35 U.S.C. § 371 of International Application No. PCT/JP2020/023358, filed Jun. 15, 2020, which claims priority from Japanese Patent Application No. 2019-141543, filed Jul. 31, 2019, all of which are incorporated herein by reference.

TECHNICAL FIELD

The present invention relates to a filtration apparatus that filters a fluid using a filter element and a filter washing method for the filtration apparatus.

BACKGROUND ART

An example of a filtration apparatus and a filter washing method for the filtration apparatus is disclosed in Patent Document 1 in which filtration is performed in a direction from an outer circumferential surface toward an inner circumferential surface of a cylindrical filter element and backwashing and high-pressure washing from the outer circumferential surface are performed in a state in which the filter element is rotated.

REFERENCE DOCUMENT LIST

Patent Document

Patent Document 1 JP 2017-006876 A

SUMMARY OF THE INVENTION

However, since a backwashing mechanism for performing backwashing and a high-pressure washing mechanism for performing high-pressure washing are arranged outside the cylindrical filter element, there is a limit to reducing a diameter of the filtration apparatus, and it is difficult to reduce manufacturing costs. Furthermore, since the filtration is performed in the direction from the outer circumferential surface toward the inner circumferential surface of the cylindrical filter element, an inward crushing force acts on the filter element by a target fluid, which is not preferable for maintaining the strength of the filter element. Furthermore, since a pipe for discharging a backwashing fluid generated by the backwashing mechanism protrudes to the outside of the filtration apparatus in a direction different from a removal direction of the backwashing mechanism, the backwashing mechanism is not easily removed during maintenance of the filtration apparatus.

Therefore, an object of the present invention, which has been made in view of the above problems, is to provide a filtration apparatus capable of achieving reduction in diameter of the filtration apparatus, improvement in strength of a filter element, and improvement of maintainability.

An aspect of the present invention provides a filtration apparatus including: a casing that is partitioned into a fluid inflow chamber including a first port, through which a target fluid flows in from the outside, and a filtration chamber configured to filter the target fluid and including a second port through which a filtered fluid, after filtration, flows out to the outside; a filter element arranged in the filtration chamber and formed in a cylindrical shape with one end and another end to filter the target fluid guided from the fluid inflow chamber, which is connected to communicate with the one end, in such a manner that the target fluid passes in a direction from an inner circumferential surface toward an outer circumferential surface, and to block an outflow of the target fluid from the other end toward the second port; a backwashing mechanism that performs backwashing by drawing the filtered fluid in a direction from the outer circumferential surface toward the inner circumferential surface of the filter element; a high-pressure washing mechanism that performs high-pressure washing by injecting a high-pressure fluid so as to pass through the filter element in the direction from the inner circumferential surface toward the outer circumferential surface of the filter element; and a rotary drive mechanism, to which the backwashing mechanism and the high-pressure washing mechanism are attached, and which rotates the backwashing mechanism and the high-pressure washing mechanism around an axial line of the filter element in an internal space of the filter element communicating with the fluid inflow chamber, wherein the high-pressure washing mechanism includes: a movable cylinder that is movable in the direction of the axial line and is rotatable around the axial line; a piston rod including a piston portion, which is accommodated in the movable cylinder and is not movable in the direction of the axial line, and two fluid supply paths that supply the high-pressure fluid to the first fluid chamber and the second fluid chamber, which are partitioned in the internal space of the movable cylinder by the piston portion, from the outside, respectively; and a plurality of injection nozzles that are provided in the movable cylinder to inject the high-pressure fluid to the outside in a state in which one or more of the injection nozzles communicate with the first fluid chamber, and the other one or more of the injection nozzles communicate with the second fluid chamber, and the high-pressure washing mechanism being configured such that the movable cylinder is configured to reciprocate in the direction of the axial line by sequentially switching the fluid supply path that supplies the high-pressure fluid out of the two fluid supply paths, and the filtration apparatus further includes a flow rate control valve that is provided on a shunt path, at which the two fluid supply paths are shunted, and is capable of supplying some of the high-pressure fluids from one fluid supply path, which supplies the high-pressure fluid, out of the two fluid supply paths to the other fluid supply path.

Another aspect of the present invention provides a filtration apparatus including: a casing that is partitioned into a fluid inflow chamber including a first port, through which a target fluid flows in from the outside, and a filtration chamber configured to filter the target fluid and including a second port through which a filtered fluid after filtration flows out to the outside; a filter element arranged in the filtration chamber and formed in a cylindrical shape with one end and another end to filter the target fluid guided from the fluid inflow chamber, which is connected to communicate with the one end, in such a manner that the target fluid passes in a direction from an inner circumferential surface toward an outer circumferential surface, and to block an outflow of the target fluid from the other end toward the second port; a backwashing mechanism that performs backwashing by drawing the filtered fluid in a direction from the outer circumferential surface toward the inner circumferential surface of the filter element; a high-pressure washing mechanism that performs high-pressure washing by injecting a high-pressure fluid so as to pass through the filter element in the direction from the inner circumferential surface toward the outer circumferential surface of the filter element; a rotary drive mechanism that includes, attached thereto, the backwashing mechanism and the high-pressure washing mechanism and rotates the backwashing mechanism and the high-pressure washing mechanism around an axial line of the filter element in an internal space of the filter element communicating with the fluid inflow chamber; a first discharge path that communicates with the internal space through the other end of the filter element and discharges a backwashing fluid generated by the backwashing when the filtered fluid passes through the filter element; and a second discharge path that communicates with the internal space through the other end of the filter element and discharges a washing fluid generated by the high-pressure washing, wherein the high-pressure washing mechanism includes: a movable cylinder that is movable in the direction of the axial line and is rotatable around the axial line; a piston rod including a piston portion, which is accommodated in the movable cylinder and is not movable in the direction of the axial line, and two fluid supply paths that supply the high-pressure fluid to the first fluid chamber and the second fluid chamber, which are partitioned in the internal space of the movable cylinder by the piston portion, from the outside, respectively; and a plurality of injection nozzles that are provided in the movable cylinder to inject the high-pressure fluid in a state in which one or more of the injection nozzles communicate with the first fluid chamber, and the other one or more of the injection nozzles communicate with the second fluid chamber, and the high-pressure washing mechanism being configured such that the movable cylinder is configured to reciprocate in the direction of the axial line by sequentially switching the fluid supply path that supplies the high-pressure fluid out of the two fluid supply paths, and an injection axial-line of the injection nozzle is inclined in a direction from a position of the injection nozzle toward a position of the other end of the filter element on the axial line with respect to a direction orthogonal to the axial line.

An aspect of the present invention provides a filter washing method of a filtration apparatus, the filtration apparatus including: a casing that is partitioned into a fluid inflow chamber including a first port, through which a target fluid flows in from the outside, and a filtration chamber configured to filter the target fluid and including a second port through which a filtered fluid after filtration flows out to the outside; and a filter element arranged in the filtration chamber and formed with one end and another end in a cylindrical shape, the filter element being configured to filter the target fluid guided from the fluid inflow chamber, which is connected to communicate with the one end, in such a manner that the target fluid passes in a direction from an inner circumferential surface toward an outer circumferential surface, and to block an outflow of the target fluid from the other end toward the second port, the method including: performing backwashing by drawing the filtered fluid in a direction from the outer circumferential surface toward the inner circumferential surface of the filter element; performing high-pressure washing by injecting a high-pressure fluid so as to pass through the filter element in the direction from the inner circumferential surface toward the outer circumferential surface of the filter element; and rotating a mechanism for performing the backwashing and a mechanism for performing the high-pressure washing around an axial line of the filter element in an internal space of the filter element communicating with the fluid inflow chamber, during the backwashing and the high-pressure washing, wherein the mechanism for performing the high-pressure washing includes: a movable cylinder that is movable in the direction of the axial line and is rotatable around the axial line; a piston rod including a piston portion, which is accommodated in the movable cylinder and is not movable in the direction of the axial line, and two fluid supply paths that supply the high-pressure fluid to the first fluid chamber and the second fluid chamber, which are partitioned in the internal space of the movable cylinder by the piston portion, from the outside, respectively; and a plurality of injection nozzles that are provided in the movable cylinder to inject the high-pressure fluid in a state in which one or more of the injection nozzles communicate with the first fluid chamber, and the other one or more of the injection nozzles communicate with the second fluid chamber, and the high-pressure washing mechanism being configured such that the movable cylinder is configured to reciprocate in the direction of the axial line by sequentially switching the fluid supply path that supplies the high-pressure fluid out of the two fluid supply paths, and a moving speed of the movable cylinder is reduced by supplying some of the high-pressure fluids from one fluid supply path, which supplies the high-pressure fluid, out of the two fluid supply paths to the other fluid supply path.

An aspect of the present invention provides a filter washing method of a filtration apparatus, the filtration apparatus including: a casing that is partitioned into a fluid inflow chamber including a first port, through which a target fluid flows in from the outside, and a filtration chamber configured to filter the target fluid and including a second port through which a filtered fluid after filtration flows out to the outside; and a filter element arranged in the filtration chamber and formed with one end and another end in a cylindrical shape, the filter element being configured to filter the target fluid guided from the fluid inflow chamber, which is connected to communicate with the one end, in such a manner that the target fluid passes in a direction from an inner circumferential surface toward an outer circumferential surface, and to block an outflow of the target fluid from the other end toward the second port, the method including: performing backwashing by drawing the filtered fluid in a direction from the outer circumferential surface toward the inner circumferential surface of the filter element; performing high-pressure washing by injecting a high-pressure fluid so as to pass through the filter element in the direction from the inner circumferential surface toward the outer circumferential surface of the filter element; rotating a mechanism for performing the backwashing and a mechanism for performing the high-pressure washing around an axial line of the filter element in an internal space of the filter element communicating with the fluid inflow chamber, during the backwashing and the high-pressure washing; discharging a backwashing fluid, which is generated when the filtered fluid passes through the filter element by the backwashing, through the other end of the filter element; and discharging a washing fluid, which is generated by the high-pressure washing, through the other end of the filter element, wherein the mechanism for performing the high-pressure washing includes: a movable cylinder that is movable in the direction of the axial line and is rotatable around the axial line; a piston rod including a piston portion, which is accommodated in the movable cylinder and is not movable in the direction of the axial line, and two fluid supply paths that supply the high-pressure fluid to the first fluid chamber and the second fluid chamber, which are partitioned in the internal space of the movable cylinder by the piston portion, from the outside, respectively; and a plurality of injection nozzles that are provided in the movable cylinder to inject the high-pressure fluid in a state in which one or more of the injection nozzles communicate with the first fluid chamber, and the other one or more of the injection nozzles communicate with the second fluid chamber, and the high-pressure washing mechanism being configured such that the movable cylinder is configured to reciprocate in the direction of the axial line by sequentially switching the fluid supply path that supplies the high-pressure fluid out of the two fluid supply paths, and the injection nozzle is inclined in a direction from a position of the injection nozzle toward a position of the other end of the filter element on the axial line with respect to a direction orthogonal to the axial line and injects the high-pressure fluid.

According to the filtration apparatus of the present invention, it is possible to achieve reduction in dimension of the filtration apparatus, improvement in strength of a filter element, and improvement of maintainability.

DETAILED DESCRIPTION

Embodiments of the present invention will be described in detail with reference to the accompanying drawings.

First Embodiment

Figure 1:
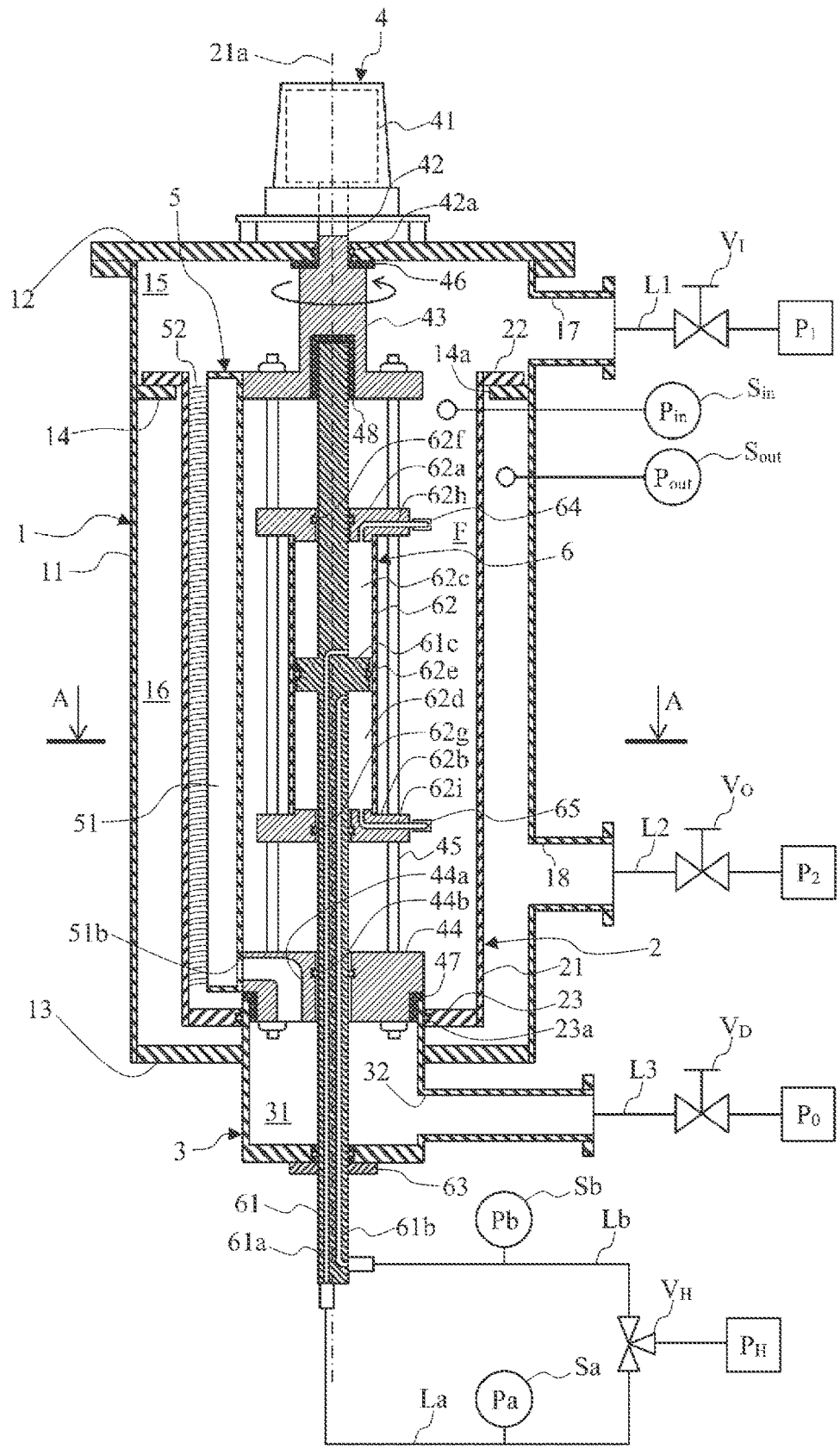
FIG. 1 is a central vertical cross-sectional view showing an example of a filtration apparatus according to a first embodiment.
Figure 2:
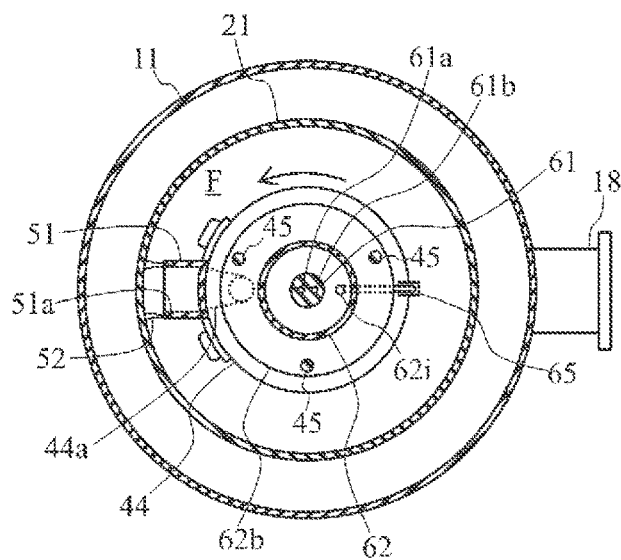
FIG. 2 is a transverse cross-sectional view taken along line A-A in FIG. 1.

FIGS. 1 and 2 show an example of a filtration apparatus according to a first embodiment. The filtration apparatus has a filtering function of making various fluids to be filtered (hereinafter, referred to as "target fluids") pass through a built-in filter element to perform filtration. Examples of the target fluids include river water, lake water, or seawater, liquid used in general industry such as cooling water or process liquid for various apparatuses, oil such as lubricating oil or diesel fuel oil, various raw material gases used in chemical factories, or ship ballast water. Specifically, the filtration apparatus includes a casing 1 and a filter unit 2 as a configuration that embodies the filtering function.

The casing 1 is a tubular body (for example, a cylindrical body) 11 forming an outer shell of the filtration apparatus, and has a closed space therein with a first casing lid plate 12 that closes one end opening and a second casing lid plate 13 that closes the other end opening. An inside of the casing 1 is partitioned into two spaces by a partition plate 14 facing (for example, substantially parallel with) the first casing lid plate 12 and the second casing lid plate 13. The space between the first casing lid plate 12 and the partition plate 14 is provided with a fluid inflow chamber 15 into which the target fluid flows in from the outside, and the space between the partition plate 14 and the second casing lid plate 13 is provided with a filtration chamber 16 in which the target fluid in the fluid inflow chamber 15 is filtered. The material of the casing 1 is metal, synthetic resin or the like, and the shape and dimension thereof can be appropriately determined according to the purpose of use of the filtration apparatus, the type or amount of the target fluid, or an installation location of the filtration apparatus.

The fluid inflow chamber 15 includes a first port 17 penetrating the inside and outside of the tubular body 11, and allows the target fluid to flow in from the outside through the first port 17. The filtration chamber 16 includes a second port 18 penetrating the inside and outside of the tubular body 11, and allows a fluid after filtration of the target fluid (hereinafter, referred to as "filtered fluid") to flow out to the outside through the second port 18. The fluid inflow chamber 15 and the filtration chamber 16 communicate with each other through a substantially circular connecting hole 14a penetrating the partition plate 14 in a direction from the first casing lid plate 12 to the second casing lid plate 13.

The filter unit 2 includes a cylindrical filter element 21 that filters the target fluid, and is arranged inside the filtration chamber 16 such that an axial line 21a of the filter element 21 extends from the partition plate 14 toward the second casing lid plate 13. A flange portion 22 is radially attached to an outer circumference of one end of the filter element 21 over the entire circumference, and an opening of the other end of the filter element 21 is closed by the filter lid plate 23. The flange portion 22 and the filter lid plate 23 also function as a structure for maintaining a shape in a radial direction of the filter element 21. One end of the filter element 21 is connected to communicate with the fluid inflow chamber 15 as the flange portion 22 is connected and fixed around the connecting hole 14a, and the opening of the one end of the filter element 21 faces the fluid inflow chamber 15. Thereby, an internal space F of the filter element 21 constitutes a part of the fluid inflow chamber 15 through the opening of the one end. The target fluid flowing into the fluid inflow chamber 15 is filtered by passing through the filter element 21 in a direction from an inner circumferential surface (hereinafter, referred to as a "filtration surface") to an outer circumferential surface (hereinafter, referred to as an "anti-filtration surface") of the filter element 21, whereby the filtered fluid is generated.

Figure 3:
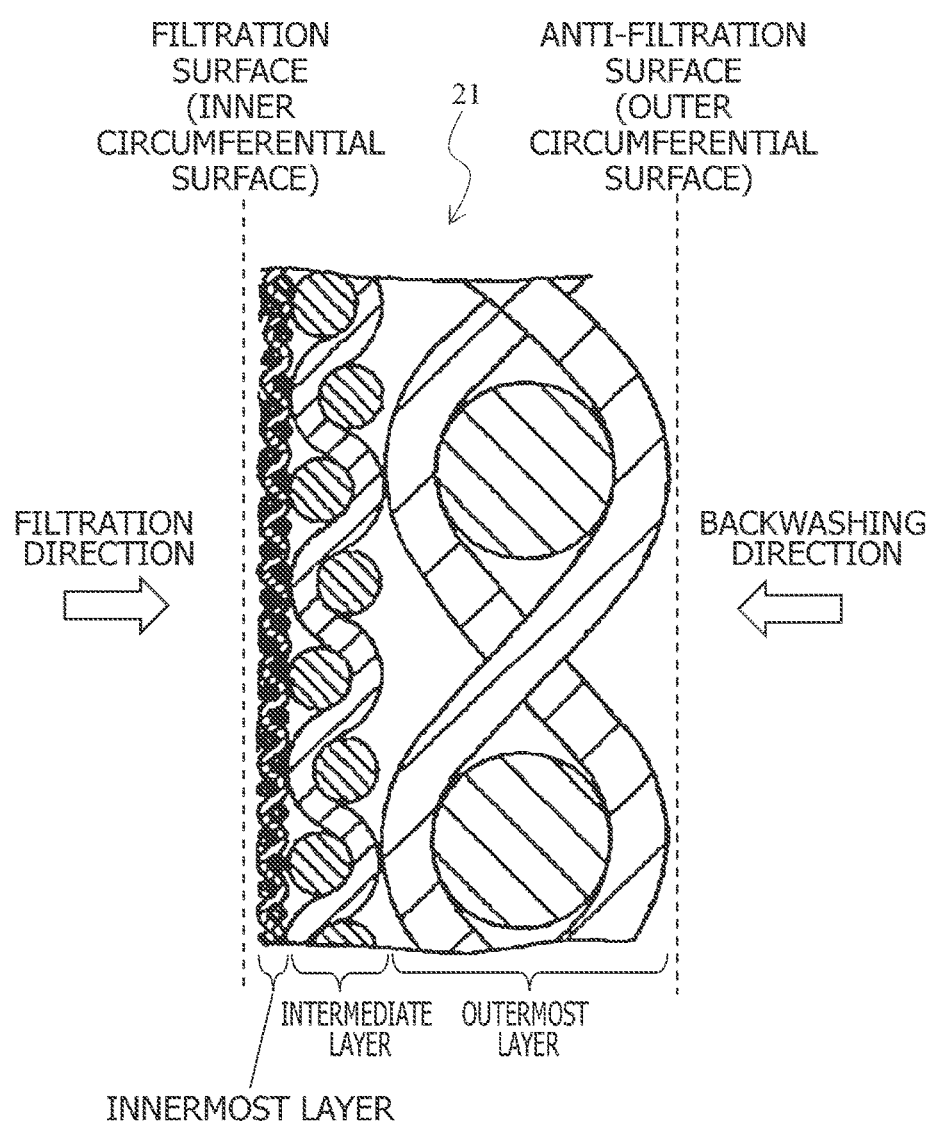
FIG. 3 is a cross-sectional view showing an example of a layer structure of a filter in the filtration apparatus.

The filter element 21 may be laminated in a plurality of layers as in the conventional filter element shown in FIG. 3, and the innermost layer on the filtration surface side of the filter element 21 may have the finest mesh. Examples of the filter element include a filter having high shape retention by sintering of a plurality of laminated wire meshes and formed in a cylindrical shape, a cylindrical notch wire filter, a wedge wire filter, and a filter having pores in a plate member. In the filter obtained by sintering, a mesh size of the innermost layer is 10 to 200 μm as appropriate, and a mesh size of a layer outside of the innermost layer is 200 to 5000 μm as appropriate. In this case, a reinforcing mesh and a protective mesh other than the innermost layer are related to the strength of the filter unit 2, and thus, the number of layers, the size of the mesh, and the wire diameter are selected such that the required strength can be obtained. In addition, as a weaving method of the mesh, plain weaving, twill weaving, satin weaving, tatami weaving, and twill weaving may be applied. The outermost layer on the anti-filtration surface side of the filter element 21 is used as a wire mesh, and may be sintered in a state in which the wire mesh is provided with a cylindrical punching plate in which innumerable square holes are bored and a reinforcing member in which a plurality of thin rods are arranged in vertical and horizontal directions.

In addition to the filtering function, the filtration apparatus has a filter washing function of peeling off, from the filter element 21, trapped materials such as fine particles and dust trapped in the filter element 21. The filter washing function includes backwashing and high-pressure washing. The filtration apparatus includes a backwashing drain case 3, rotary drive mechanism 4, a backwashing mechanism 5, and a high-pressure washing mechanism 6 as a configuration that embodies the filter washing function.

The backwashing drain case 3 is a bottomed tubular body (for example, a bottomed cylindrical body) in which one end is opened in the internal space F of the filter element 21, the other end penetrates the filter lid plate 23 and the second casing lid plate 13 in a direction of the axial line 21*a* and extends to the outside of the casing 1, and an extension end opening is closed. The backwashing drain case 3 supports the filter element 21 by fitting one end thereof into a through hole of the filter lid plate 23. The backwashing drain case 3 forms a backwashing drain chamber 31, which accommodates a fluid containing trapped materials peeled off from the filter element 21 (hereinafter, referred to as "backwashing fluid") by backwashing as described below, in the internal space of the tubular body, and constitutes a part of the casing 1. The backwashing drain case 3 includes a backwashing drain port 32 that communicates the backwashing drain chamber 31 with the outside of the filtration apparatus. A sealing member 23*a* such as an O-ring is provided between an inner circumferential surface of the through hole of the filter lid plate 23 and an outer circumferential surface of the backwashing drain case 3 inserted through the through hole for the purpose of preventing fluid leakage.

The rotary drive mechanism 4 is a mechanism that includes, for example, a drive source 41 such as a motor with a speed reducer outside the casing 1 and transmits a rotational force from the drive source 41 to the backwashing mechanism 5 and the high-pressure washing mechanism 6 through an output shaft 42. For example, when the axial line 21*a* of the filter element 21 is in a vertical direction, the drive source 41 is installed on the first casing lid plate 12. The rotary drive mechanism 4 includes, as a configuration in which the rotational force is transmitted from the output shaft 42 to the backwashing mechanism 5 and the high-pressure washing mechanism 6, a first end rotating body 43, a second end rotating body 44, and a coupling shaft 45 from the outside of the casing 1 to the fluid inflow chamber 15 and the internal space F of the filter element 21.

The first end rotating body 43 is coupled to the output shaft 42 such that a rotational force can be transmitted outside the casing 1. The first end rotating body 43 extends to the fluid inflow chamber 15 from the coupling portion with the output shaft 42 by penetrating the first casing lid plate 12, and is inserted into an annular first bearing 46 arranged and fixed to the first casing lid plate 12 in the fluid inflow chamber 15 so as to be relatively rotatable around the axial line 21*a*. A sealing member 42*a* such as an O-ring is provided between an inner circumferential surface of the through hole of the first casing lid plate 12 and an outer circumferential surface of the first end rotating body 43 inserted thereinto for the purpose of preventing fluid leakage between the inside and outside of the casing 1.

The second end rotating body 44 is inserted into an annular second bearing 47 so as to be relatively rotatable around the axial line 21*a* at a position near the filter lid plate 23 in a direction of the axial line 21*a*. An outer circumferential surface of the second bearing 47 is closely fitted and fixed to the opening of one end of the backwashing drain case 3. When the second end rotating body 44 is inserted into the second bearing 47 so as to be relatively rotatable, the opening of the one end of the backwashing drain case 3 is closed. The second end rotating body 44 is coupled to the first end rotating body 43 by at least one coupling shaft 45 extending linearly substantially parallel to the axial line 21*a*, and the rotational force of the output shaft 42 is transmitted to the second end rotating body 44 from the first end rotating body 43 through the coupling shaft 45.

The first end rotating body 43 and the second end rotating body 44 coupled to each other through the coupling shaft 45 in this way are rotatably supported around the axial line 21*a* by the first bearing 46 and the second bearing 47, and movement thereof in the direction of the axial line 21*a* is restricted between the first bearing 46 and the second bearing 47.

The backwashing mechanism 5 is a mechanism for performing backwashing that causes the filtered fluid to flow back from the anti-filtration surface of the filter element 21 toward the filtration surface and to be drawn, so that trapped materials, which are mainly trapped from the filtration surface side by filtration, on the innermost layer are removed and the filter element 21 is washed. Specifically, the backwashing mechanism 5 includes a backwashing head 51 and a removing brush 52.

The backwashing head 51 is a pipe-shaped body that extends along the filtration surface from the flange portion 22 of the filter element 21 to the filter lid plate 23 and is closed at both ends. The backwashing head 51 is connected and fixed to at least one of the first end rotating body 43 and the second end rotating body 44, and rotates around the axial line 21*a* by the rotary drive mechanism 4. The backwashing head 51 includes a drawing hole 51*a*, which communicates with inside and outside the pipe at a portion of the pipe-shaped body facing the filtration surface, over the entire length in the pipe length direction. The backwashing fluid described above is generated when the backwashing head 51 draws the filtered fluid in a direction from the anti-filtration surface of the filter element 21 toward the filtration surface through the drawing hole 51a and the filtered fluid flows back through the filter element 21. When rotating by the rotary drive mechanism 4, the backwashing head 51 may be configured such that an opening end of the drawing hole 51a is in sliding contact with the filtration surface of the filter element 21.

The backwashing head 51 is provided with a backwashing fluid discharge port 51b that penetrates from the inside of the pipe toward the second end rotating body 44, and the backwashing fluid discharge port 51b is connected to communicate with a backwashing fluid discharge path 44a that is an internal passage formed in the second end rotating body 44. Through the backwashing fluid discharge path 44a, the backwashing fluid generated in the pipe of the backwashing head 51 is discharged from the backwashing fluid discharge port 51b to the backwashing drain chamber 31.

The removing brush 52 is a sliding contact member of which a tip is in sliding contact with the filtration surface when the backwashing head 51 rotates by the rotary drive mechanism 4, and is transplanted around the drawing hole 51a of the backwashing head 51. A material of brush bristles of the removing brush 52 is, for example, natural or synthetic fiber, or a metal wire such as steel, copper, or brass, and is appropriately selected depending on the purpose of use of the filtration apparatus and the type of target fluid. Instead of the removing brush 52, as a sliding contact member, a scraper formed of a metal, a resin, or a rubber in a shape of a blade or a spatula can be provided around the drawing hole 51a.

The high-pressure washing mechanism 6 is a mechanism for performing high-pressure washing to mainly remove trapped materials, which are difficult to be removed by the backwashing, on an intermediate layer or the outermost layer by injecting a high-pressure fluid onto the filtration surface of the filter element 21 and passing it through the anti-filtration surface. The high-pressure washing mechanism 6 is configured to be capable of partially reciprocating in the direction of the axial line 21a in addition to the rotational motion by the rotary drive mechanism 4. Specifically, the high-pressure washing mechanism 6 includes a piston rod 61 and a movable cylinder 62 through which the piston rod 61 is inserted.

The piston rod 61 is a columnar body or a circular cylinder body having the same axial line as the axial line 21a, and extends from the outside of the backwashing drain case 3 to the first end rotating body 43 by penetrating the second end rotating body 44 so as to be relatively rotatable. One end of the piston rod 61 is fixed to the backwashing drain case 3 by a fixture 63 having a function as a stopper and a detent. The other end of the piston rod 61 is supported so as to be rotatable relative to the first end rotating body 43 through an intermediate bearing 48. For the purpose of fluid-tightness or airtightness between the internal space F of the filter element 21 and the backwashing drain chamber 31, a sealing member 44b such as an O-ring is provided between an inner circumferential surface of the through hole of the second end rotating body 44 and an outer circumferential surface of the piston rod 61 penetrating the second end rotating body 44.

The piston rod 61 includes a disk-shaped piston portion 61c of which the entire circumference swells in the radial direction at an intermediate position between the first end rotating body 43 and the second end rotating body 44. The piston portion 61c has an axial line in common with the axial line 21a. Furthermore, a first fluid supply path 61a and a second fluid supply path 61b are provided inside the piston rod 61 to supply a high-pressure fluid. The first fluid supply path 61a is open to the outside of the piston rod 61 between the piston portion 61c and the first end rotating body 43 (for example, in the vicinity of the piston portion 61c). The second fluid supply path 61b is open to the outside of the piston rod 61 between the piston portion 61c and the second end rotating body 44 (for example, in the vicinity of the piston portion 61c). Then, the first fluid supply path 61a and the second fluid supply path 61b extend to one end at which the piston rod 61 is fixed to the backwashing drain case 3.

The movable cylinder 62 is a circular cylinder body in which the piston rod 61 is inserted into an internal space thereof and the piston portion 61c is accommodated so as to be relatively movable in the direction of the axial line 21a. In the movable cylinder 62, an opening of one end is closed by a first closing plug 62a through which the piston rod 61 penetrates so as to be relatively movable in the direction of the axial line 21a. In the movable cylinder 62, an opening of the other end is closed by a second closing plug 62b through which the piston rod 61 penetrates so as to be relatively movable in the direction of the axial line 21a. In the first closing plug 62a and the second closing plug 62b, the coupling shaft 45 penetrates so as to be relatively movable in the direction of the axial line 21a. The internal space of the movable cylinder 62 is partitioned into two fluid chambers by the piston portion 61c, a first fluid chamber 62c is formed between the piston portion 61c and the first closing plug 62a, and a second fluid chamber 62d is formed between the piston portion 61c and the second closing plug 62b. A high-pressure fluid is supplied to the first fluid chamber 62c through the first fluid supply path 61a, and a high-pressure fluid is supplied to the second fluid chamber 62d through the second fluid supply path 61b.

The movable cylinder 62 can rotate relative to the piston portion 61c around an axial line common to the axial line 21a. In addition, the first closing plug 62a and the second closing plug 62b can rotate relative to the piston rod 61 around an axial line common to the axial line 21a.

A sealing member 62e such as an O-ring is provided between an inner circumferential surface of the movable cylinder 62 and an outer circumferential surface of the piston portion 61c to prevent fluid leakage between the first fluid chamber 62c and the second fluid chamber 62d. Furthermore, sealing members 62f and 62g such as O-rings are provided between the outer circumferential surface of the piston rod 61 and the inner circumferential surface of the through hole of the first closing plug 62a and between the outer circumferential surface of the piston rod 61 and the inner circumferential surface of the through hole of the second closing plug 62b, respectively, to prevent fluid leakage between the inside and the outside of the movable cylinder 62.

A first injection nozzle 64 is attached to the first closing plug 62a to inject the high-pressure fluid in the first fluid chamber 62c toward the inner circumferential surface (filtration surface) of the filter element 21, and the first fluid chamber 62c and the first injection nozzle 64 communicate with each other through a first injection path 62h. A second injection nozzle 65 is attached to the second closing plug 62b to inject the high-pressure fluid in the second fluid chamber 62d toward the inner circumferential surface of the filter element 21, and the second fluid chamber 62d and the second injection nozzle 65 communicate with each other through a second injection path 62i.

In the above configuration, even when there is an error between the axial line of the rotary drive mechanism 4 or the piston rod 61 and the axial line 21a, no major problem occurs for the following reasons. The reason is that the high-pressure washing mechanism 6 configured to inject the high-pressure fluid onto the filtration surface from the injection nozzles 64 and 65 is arranged apart from the filter element 21. In addition, the reason is that even when the backwashing head 51 does not come into sliding contact with the filtration surface depending on the rotation position, the error of the axial line can be absorbed by deflection given to the flexible removing brush 52 in advance.

Next, description will be given with respect to an external piping system and various pressure detection units required for filtration, backwashing, and high-pressure washing in the filtration apparatus.

One end of a target fluid inflow pipe L1 is connected to the first port 17 of the fluid inflow chamber 15 to be configured to supply the target fluid from the outside. The other end of the target fluid inflow pipe L1 is connected to a target fluid supply source, such as a pump, of a primary pressure $P_1$ through an inflow valve $V_I$ configured to open and close the pipeline on the way. One end of a filtered fluid outflow pipe L2 is connected to the second port 18 of the filtration chamber 16 to be configured to cause the filtered fluid to flow out to the outside. The other end of the filtered fluid outflow pipe L2 is connected to a pressure vessel, such as a filtered fluid storage tank, of a secondary pressure $P_2$ through an outflow valve $V_O$ configured to open and close the pipeline on the way. One end of the backwashing drain port 32 of the backwashing drain chamber 31 is connected to one end of a backwashing fluid discharge pipe L3 configured to discharge the backwashing fluid contained in the backwashing drain chamber 31. The other end of the backwashing fluid discharge pipe L3 is open to a space of an ambient pressure $P_0$ such as an atmospheric pressure through a backwashing drain valve $V_D$ configured to open and close the pipeline on the way. Here, the primary pressure $P_1$, the secondary pressure $P_2$, and the ambient pressure $P_0$ decrease in this order ($P_0 < P_2 < P_1$). The primary pressure $P_1$ is set to be greater than a value obtained by adding a pressure loss inside the filtration apparatus due to resistance to filtration of the filter element 21 and a pressure loss due to resistance to flow path of the pipes and the valves to the secondary pressure $P_2$.

The first fluid supply path 61a is connected through a first fluid supply pipe La to a first branch port of a three-way valve $V_H$ having a supply port connected to a high-pressure fluid supply source. The high-pressure fluid supply source is configured to supply a clean high-pressure fluid of a supply pressure $P_H$ (for example, 10 MPa). Furthermore, the second fluid supply path 61b is connected to a second branch port of a three-way valve $V_H$ through a second fluid supply pipe Lb. The three-way valve $V_H$ is set to any one of a first setting in which the supply port and the first branch port are opened, a second setting in which the supply port and the second branch port are opened, and a third setting in which at least the supply port is closed. The high-pressure fluid is supplied to the first fluid chamber 62c through the first fluid supply path 61a in the first setting, and the high-pressure fluid is supplied to the second fluid chamber 62d through the second fluid supply path 61b in the second setting. By switching the three-way valve $V_H$ between the first setting and the second setting, the movable cylinder 62 reciprocates in the direction of the axial line 21a.

The filtration apparatus includes a filter internal-pressure detection unit $S_{in}$ and a filter external-pressure detection unit $S_{out}$ configured to detect the pressure loss of filtration due to the filter element 21. The filter internal-pressure detection unit $S_{in}$ includes a pressure sensor configured to detect a pressure (filter internal-pressure $P_{in}$) in the internal space F which is on the filtration surface side of the filter element 21, and displays a filter internal-pressure $P_{in}$ based on an output signal thereof. Similarly, the filter external-pressure detection unit $S_{out}$ includes a pressure sensor configured to detect a pressure (filter external-pressure $P_{out}$) of the filtration chamber 16 which is on the anti-filtration surface side of the filter element 21, and displays a filter external-pressure $P_{out}$ based on an output signal thereof.

In addition, the filtration apparatus includes a first fluid pressure detection unit Sa configured to detect a fluid pressure Pa on the first fluid supply path 61a and a second fluid pressure detection unit Sb configured to detect a fluid pressure Pb on the second fluid supply path 61b. The first fluid pressure detection unit Sa includes, for example, a pressure sensor configured to detect the fluid pressure Pa on the first fluid supply path 61a in the first fluid supply pipe La, and displays the fluid pressure Pa based on an output signal thereof. Similarly, the second fluid pressure detection unit Sb includes, for example, a pressure sensor configured to detect the fluid pressure Pb on the second fluid supply path 61b in the second fluid supply pipe Lb, and displays the fluid pressure Pb based on an output signal thereof.

Figure 4:
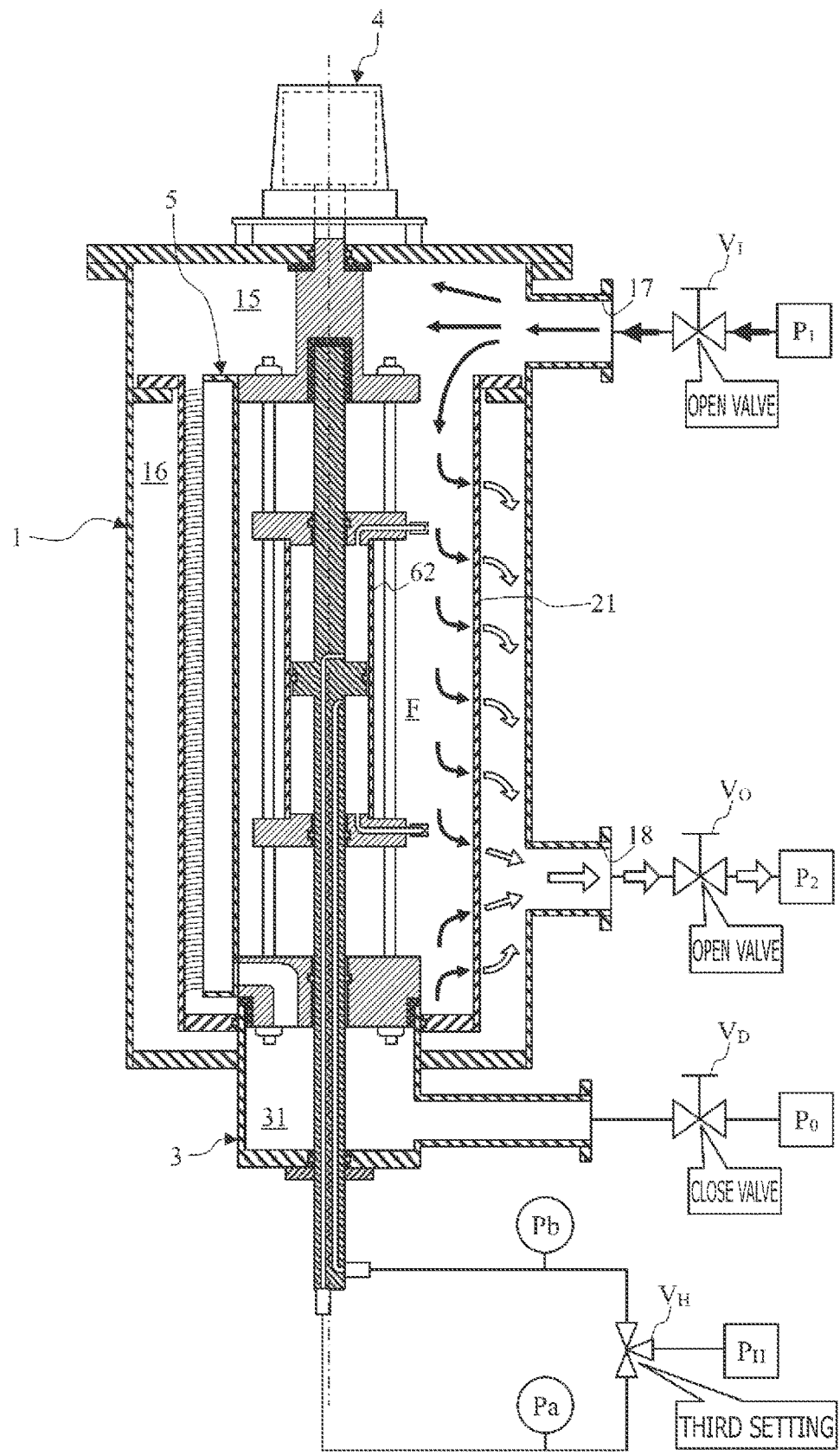
FIG. 4 is a central vertical cross-sectional view showing an operation during filtration of the filtration apparatus.
Figure 6:
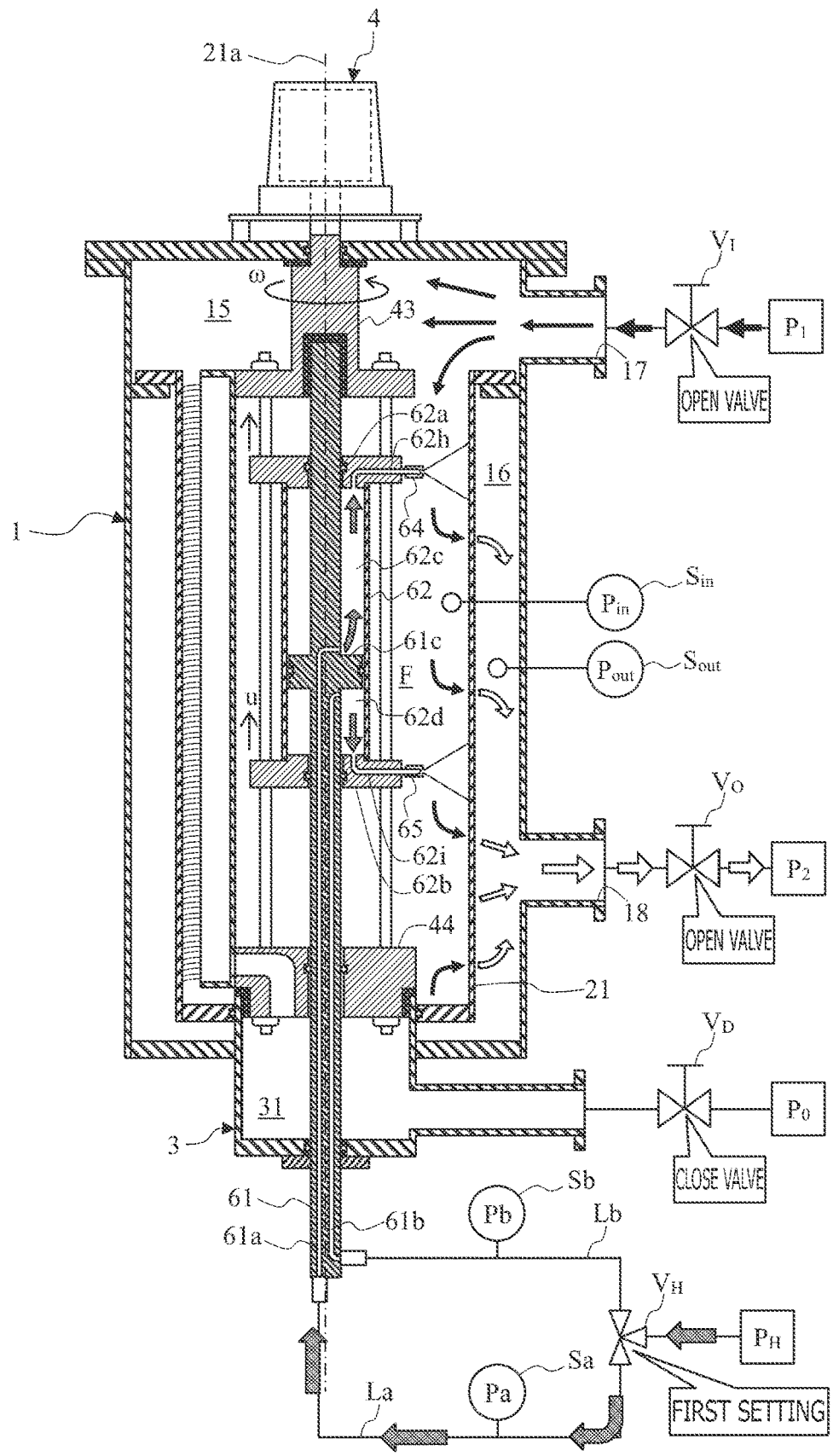
FIG. 6 is a central vertical cross-sectional view showing a first operation during high-pressure washing of the filtration apparatus.
Figure 7:
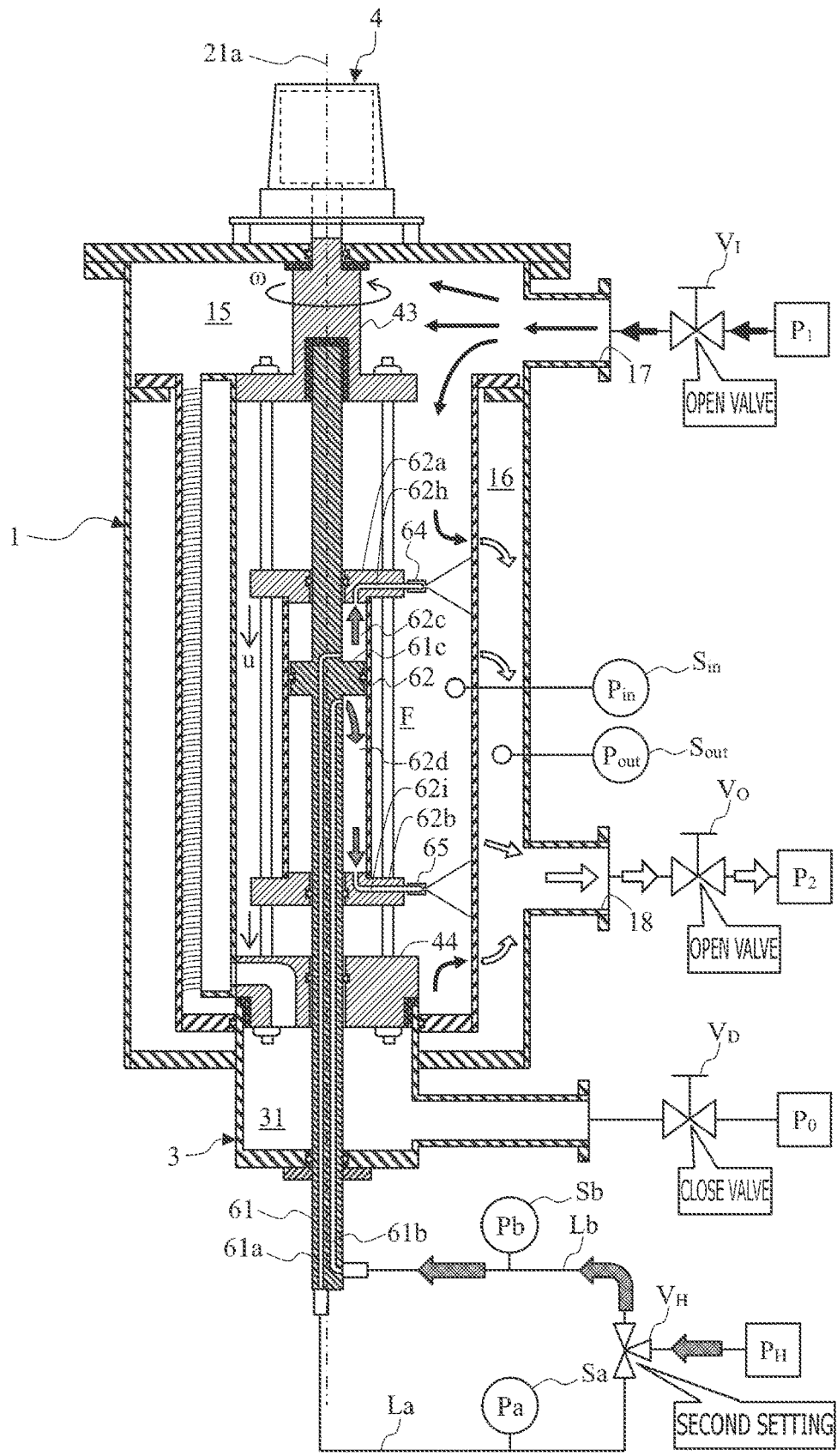
FIG. 7 is a central vertical cross-sectional view showing a second operation during high-pressure washing of the filtration apparatus.

Next, an operation of the filtration apparatus will be described with reference to FIGS. 4 to 7. FIG. 4 shows an operation during filtration, FIG. 5 shows an operation during backwashing, FIG. 6 shows a first operation during high-pressure washing in which the movable cylinder 62 moves in one direction, and FIG. 7 shows a second operation during high-pressure washing in which the movable cylinder 62 moves in the other direction.

As shown in FIG. 4, during the filtration, the rotary drive mechanism 4 is not operated. In addition, the inflow valve $V_I$ and the outflow valve $V_O$ are opened and the backwashing drain valve $V_D$ is closed. Furthermore, the three-way valve $V_H$ is set to the third setting, and the fluid is not supplied to the movable cylinder 62. With such a setting, the fluid pressure of the second port 18 becomes lower than the fluid pressure of the first port 17, so that the pressure of the filtration chamber 16 becomes lower than the pressure of the fluid inflow chamber 15. Therefore, the target fluid (indicated by thick solid line arrows), which has flowed into the fluid inflow chamber 15 through the first port 17, passes through the filter element 21 from the filtration surface toward the anti-filtration surface. Thereby, the filtered fluid (indicated by outline arrows) generated in the filtration chamber 16 flows out to the outside of the filtration apparatus through the second port 18.

Figure 5:
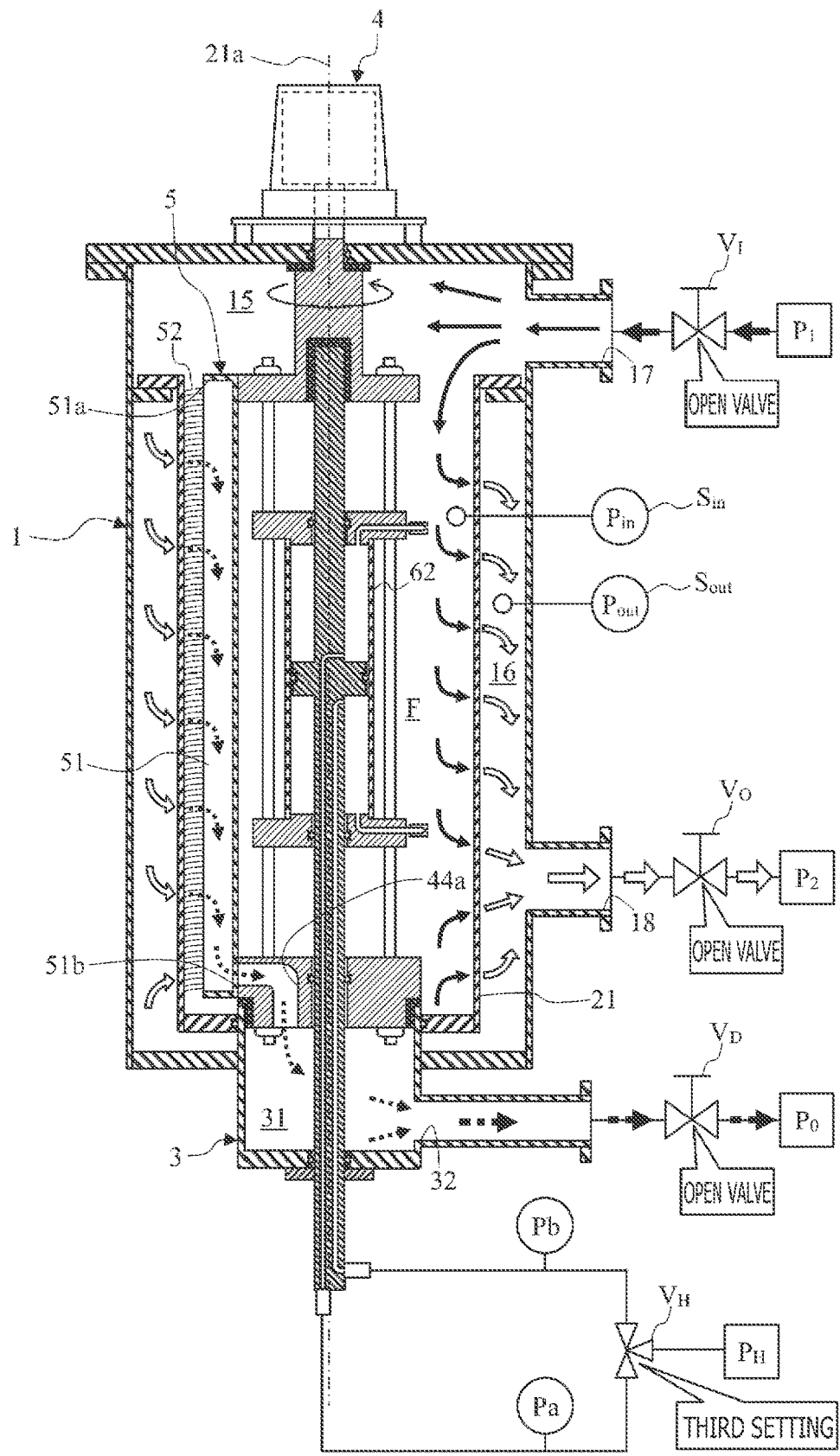
FIG. 5 is a central vertical cross-sectional view showing an operation during backwashing of the filtration apparatus.

As shown in FIG. 5, during the backwashing, the rotary drive mechanism 4 is operated, so that the backwashing head 51 rotates around the axial line 21a. In addition, the inflow valve $V_I$, the outflow valve $V_O$, and the backwashing drain valve $V_D$ are opened. Furthermore, the three-way valve $V_H$ is set to the third setting, and the fluid is not supplied to the movable cylinder 62. With such a setting, an in-pipe pressure of the backwashing head 51 is reduced, so that the filtered fluid (indicated by outline arrows) flows back in the direction from the anti-filtration surface toward the filtration surface along a strip region of the filter element 21 facing the drawing hole 51a of the backwashing head 51. When the backwashing head 51 rotationally moves along the filtration surface of the filter element 21 by the rotary drive mechanism 4, the trapped materials trapped by the filter element 21 are scraped with the removing brush 52 and the strip region facing the drawing hole 51a moves. Thus, backwashing is performed on almost the entire area of the filtration surface, and the backwashing fluid (indicated by broken line arrows) generated in the pipe of the backwashing head 51 mainly contains the tapped objects trapped from the filtration surface side during filtration and peeled off from the filter element 21. Then, the backwashing fluid is discharged to the backwashing drain chamber 31 through the backwashing fluid discharge port 51b and the backwashing fluid discharge path 44a, and is further discharged to the outside of the filtration apparatus through the backwashing drain port 32.

The backwashing can be performed at a predetermined frequency for a predetermined time according to assumed usage conditions of the filtration apparatus. Alternatively, the backwashing can be performed at an appropriate timing and time according to the amount of trapped materials actually trapped by the filter element 21. For example, the backwashing is performed when a differential pressure $\Delta P$ between the filter internal-pressure $P_{in}$ displayed by the filter internal-pressure detection unit $S_{in}$ and the filter external-pressure $P_{out}$ displayed by the filter external-pressure detection unit $S_{out}$ is equal to or greater than a predetermined value. The predetermined value is a differential pressure $\Delta P$ indicating resistance to filtration when it is estimated that the filter element 21 needs to be washed in consideration of filtration performance. The backwashing may be stopped when the differential pressure $\Delta P$ becomes less than the predetermined value.

As shown in FIGS. 6 and 7, during high-pressure washing, the rotary drive mechanism 4 operates to rotate the movable cylinder 62 around the axial line 21a. In addition, during the high-pressure washing, the inflow valve $V_I$ and the outflow valve $V_O$ are opened and the backwashing drain valve $V_D$ is closed in order to reduce downtime of the filtration apparatus by filtration at the same time. Therefore, like during the filtration and the backwashing, the high-pressure washing is performed in a state in which the target fluid and the filtered fluid are present in the filtration apparatus.

As shown in FIG. 6, when the movable cylinder 62 is moved in the direction of the first end rotating body 43, the three-way valve $V_H$ is set to the first setting. Then, the high-pressure fluid of the pressure $P_H$ flows from the three-way valve $V_H$ into the first fluid chamber 62c through the first fluid supply path 61a to fill the first fluid chamber 62c, and then is injected from the first injection nozzle 64 through the first injection path 62h. Furthermore, since the volume of the first fluid chamber 62c increases due to the pressure $P_H$ of the high-pressure fluid filled in the first fluid chamber 62c, the first closing plug 62a moves in the direction away from the piston portion 61c. Along with this, since the second closing plug 62b moves in the direction closer to the piston portion 61c, the volume of the second fluid chamber 62d decreases. Thereby, the fluid in the second fluid chamber 62d is also injected from the second injection nozzle 65 through the second injection path 62i.

When the first closing plug 62a comes into contact with the first end rotating body 43, the volume of the second fluid chamber 62d does not decrease. For this reason, the injection of the fluid from the second injection nozzle 65 is stopped, and the fluid pressure Pb displayed by the second fluid pressure detection unit Sb is significantly reduced from the pressure $P_H$ of the high-pressure fluid. Therefore, when the fluid pressure Pb is significantly reduced from the pressure $P_H$, the three-way valve $V_H$ may be switched to the second setting to change the moving direction of the movable cylinder 62. The high-pressure fluid filled in the first fluid chamber 62c from the three-way valve $V_H$ through the first fluid supply path 61a is used as a fluid to be injected from the first injection nozzle 64 when the movable cylinder 62 moves in the direction of the second end rotating body 44 by the switching of the setting of the three-way valve $V_H$. A distance between the first closing plug 62a and the second closing plug 62b is preferably set such that the opening of the second fluid supply path 61b facing the second fluid chamber 62d is not closed by the second closing plug 62b when the first closing plug 62a comes into contact with the first end rotating body 43.

On the other hand, as shown in FIG. 7, when the movable cylinder 62 is moved in the direction of the second end rotating body 44, the three-way valve $V_H$ is set to the second setting. Then, the high-pressure fluid of the pressure $P_H$ flows from the three-way valve $V_H$ into the second fluid chamber 62d through the second fluid supply path 61b to fill the second fluid chamber 62d, and then is injected from the second injection nozzle 65 through the second injection path 62i. Furthermore, since the volume of the second fluid chamber 62d increases due to the pressure $P_H$ of the high-pressure fluid filled in the second fluid chamber 62d, the second closing plug 62b moves in the direction away from the piston portion 61c. Along with this, since the first closing plug 62a moves in the direction closer to the piston portion 61c, the volume of the first fluid chamber 62c decreases. Thereby, the fluid in the first fluid chamber 62c is also injected from the first injection nozzle 64 through the first injection path 62h.

When the second closing plug 62b comes into contact with the second end rotating body 44, the volume of the first fluid chamber 62c does not decrease. For this reason, the injection of the fluid from the first injection nozzle 64 is stopped, and the fluid pressure Pa displayed by the first fluid pressure detection unit Sa is significantly reduced from the pressure $P_H$ of the high-pressure fluid. Therefore, when the fluid pressure Pa is significantly reduced from the pressure $P_H$, the three-way valve $V_H$ may be switched to the first setting to change the moving direction of the movable cylinder 62. The high-pressure fluid filled in the second fluid chamber 62d from the three-way valve $V_H$ through the second fluid supply path 61b is used as a fluid to be injected from the second injection nozzle 65 when the movable cylinder 62 moves in the direction of the first end rotating body 43 by the switching of the setting of the three-way valve $V_H$. The distance between the first closing plug 62a and the second closing plug 62b is preferably set such that the opening of the first fluid supply path 61a facing the first fluid chamber 62c is not closed by the first closing plug 62a when the second closing plug 62b comes into contact with the second end rotating body 44.

As shown in FIG. 6, when the high-pressure fluid of the pressure $P_H$ is supplied to the first fluid chamber 62c from the three-way valve $V_H$, a cross-sectional area of a flow path is narrowed by the first injection nozzle 64, and thus, an internal pressure of the first fluid chamber 62c becomes the pressure $P_H$. Then, an internal pressure of the second fluid chamber 62d also becomes the pressure $P_H$ due to the balance of forces in the direction of the axial line 21a in the movable cylinder 62. Therefore, when the supply pressure of the high-pressure fluid supply source connected to the three-way valve $V_H$ is stable at the pressure $P_H$, the injection flow rate of the fluid to be injected from the first injection nozzle 64 and the second injection nozzle 65 becomes constant. When the injection flow rate of the fluid from the second injection nozzle 65 is constant, a volume reduction rate of the second fluid chamber 62d becomes constant, and a moving speed of the movable cylinder 62 also becomes constant.

As shown in FIG. 7, when the high-pressure fluid of the pressure $P_H$ is supplied to the second fluid chamber 62d from the three-way valve $V_H$, a cross-sectional area of a flow path is narrowed by the second injection nozzle 65, and thus, an internal pressure of the second fluid chamber 62d becomes the pressure $P_H$. Then, an internal pressure of the first fluid chamber 62c also becomes the pressure $P_H$ due to the balance of forces in the direction of the axial line 21a in the movable cylinder 62. Therefore, when the supply pressure of the high-pressure fluid supply source connected to the three-way valve $V_H$ is stable at the pressure $P_H$, the injection flow rate of the fluid to be injected from the first injection nozzle 64 and the second injection nozzle 65 becomes constant. When the injection flow rate of the fluid from the first injection nozzle 64 is constant, a volume reduction rate of the first fluid chamber 62c becomes constant, and a moving speed of the movable cylinder 62 also becomes constant.

The pressure $P_H$ of the high-pressure fluid to be supplied from the high-pressure fluid supply source connected to the three-way valve $V_H$ and rotation power of the drive source 41 of the rotary drive mechanism 4 are set in advance so as to be capable of injecting the fluid onto the entire region of the filtration surface in consideration of injection angles indicating the spread of the injection fluid from the injection nozzles 64 and 65. When the pressure $P_H$ of the high-pressure fluid and the rotation power of the drive source 41 are set in this way, the moving speed of the movable cylinder 62 becomes a set moving speed u, and the rotating speed of the movable cylinder 62 becomes a set rotating speed ω.

For example, the set moving speed u and the set rotating speed ω can be set from the following relational expression. Here, it is assumed that L represents a one-way moving distance of the movable cylinder 62 between the first end rotating body 43 and the second end rotating body 44, n is a positive integer, each of p and q is a positive natural number, p is a value smaller than q, and p is not a common divisor other than 1 of q. The relational expression indicates that a time when the movable cylinder 62 makes one rotation at the set rotating speed ω coincides with a time when the movable cylinder 62 moves with a (n+p/q) cycle at the set moving speed u. However, one cycle is a time until the movable cylinder 62 reciprocates in the direction of the axial line 21a and returns to the original position.

$$u/\omega = \{L(n+p/q)\}/\pi$$

When the movable cylinder 62 moves a distance corresponding to the (n+p/q) cycle during one rotation, there are q moving trajectories formed by projecting the positions of the first injection nozzle 64 and the second injection nozzle 65 onto the filtration surface of the filter element 21 when the movable cylinder 62 makes one rotation. Since the interval between the movement trajectory of the injection nozzles 64 and 65 becomes smaller as a value of q increases, the value of q is set in consideration of the injection angles of the injection nozzles 64 and 65 such that the entire region of the filtration surface becomes a region to be injected. For example, the value of q is set such that the entire region of the filtration surface is injected in the shortest time. By substituting the value of q into the above relational expression, the set moving speed u and the set rotating speed ω can be determined, and furthermore, the pressure $P_H$ of the high-pressure fluid and the rotation power of the drive source 41 can be determined.

Figure 8:
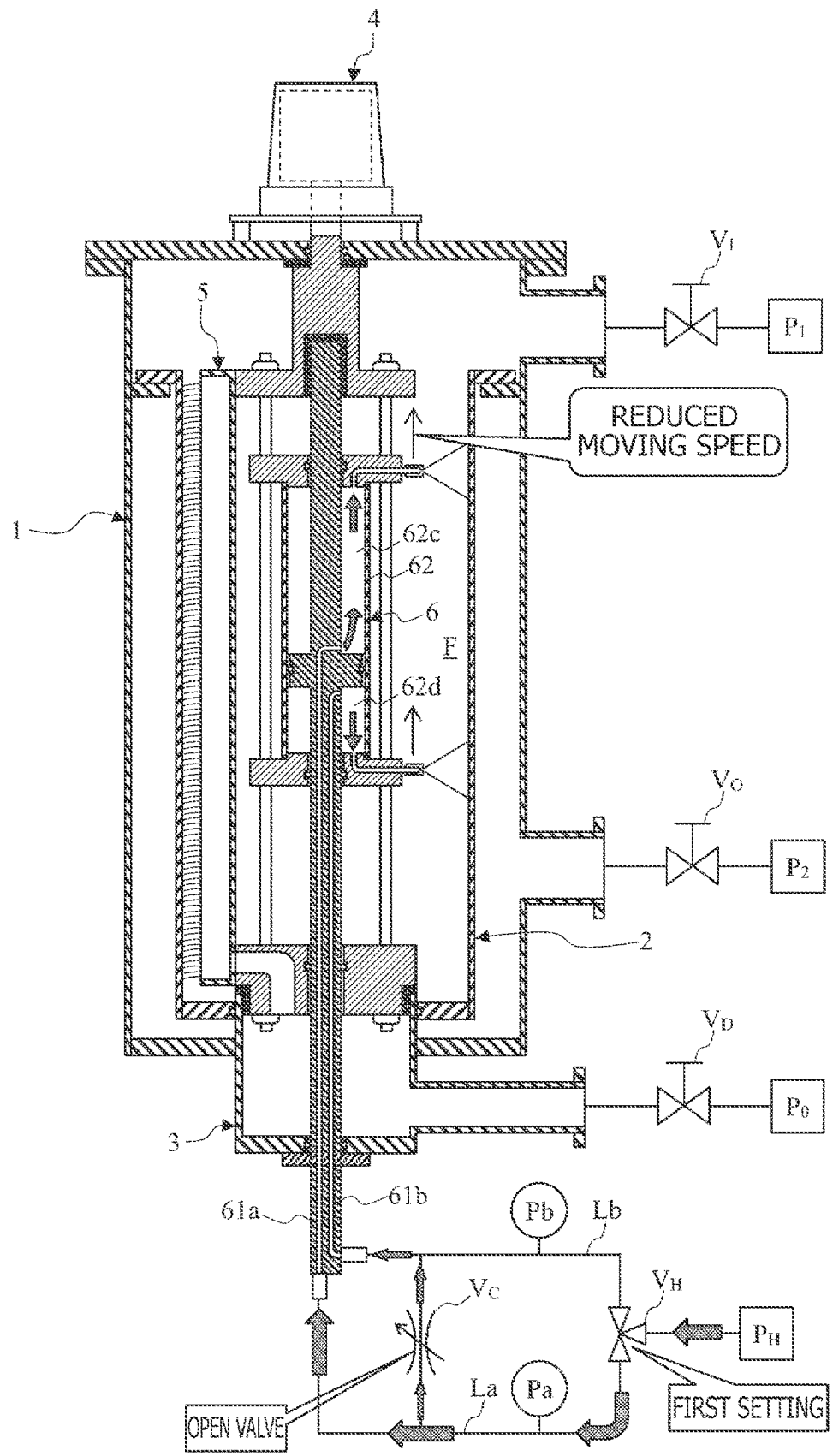
FIG. 8 is a central vertical cross-sectional view showing an operation by a flow rate control valve in the filtration apparatus.

As shown in FIG. 8, when the moving speed of the movable cylinder 62 exceeds the set moving speed u, a flow rate control valve $V_C$ capable of adjusting a flow rate may be provided on a shunt path between the first fluid supply path 61a and the second fluid supply path 61b to reduce the moving speed of the movable cylinder 62. The flow rate control valve $V_C$ is provided on a shunt path between the first fluid supply pipe La and the second fluid supply pipe Lb, for example. When the fluid is supplied to the first fluid chamber 62c through the first fluid supply path 61a by setting the three-way valve $V_H$ to the first setting, the flow rate control valve $V_C$ is slightly opened in order to reduce the moving speed of the movable cylinder 62. Thus, the internal pressure of the first fluid chamber 62c does not decrease, some of the fluids flowing into the first fluid supply path 61a from the three-way valve $V_H$ is supplied to the second fluid chamber 62d through the second fluid supply path 61b, and the volume reduction rate of the second fluid chamber 62d decreases, so that the moving speed of the movable cylinder 62 is reduced. Similarly, even when the fluid is supplied to the second fluid chamber 62d through the second fluid supply path 61b by setting the three-way valve $V_H$ to the second setting, the moving speed of the movable cylinder 62 can be reduced.

In this way, the movable cylinder 62 reciprocates in the direction of the axial line 21a by switching the setting of the three-way valve $V_H$ between the first setting and the second setting, and rotates around the axial line 21a by the rotary drive mechanism 4. Therefore, by appropriate setting of the set moving speed u and the set rotating speed ω, the first injection nozzle 64 and the second injection nozzle 65 can inject the fluid onto the entire region of the filtration surface of the filter element 21. By the high-pressure injection from the filtration surface side, the trapped materials, which are mainly difficult to remove by backwashing, on the intermediate layer and the outermost layer are peeled off into the filtration chamber 16 outside the filter element 21 and flow out to the outside together with the filtered fluid through the second port 18.

The high-pressure washing can also be performed at a preset frequency and time according to assumed usage conditions of the filtration apparatus. However, the high-pressure washing is aimed at removing trapped materials, which are mainly difficult to remove by backwashing, on the intermediate layer and the outermost layer. Since the amount of these trapped materials is small compared with the amount of trapped materials trapped from the filtration surface side which is a main target of the backwashing removal, the frequency of high-pressure washing can be made lower than the frequency of backwashing.

Instead of performing the high-pressure washing at the predetermined frequency, it is possible to determine whether the high-pressure washing can be performed depending on the amount of trapped materials actually trapped by the filter element 21. For example, upon completion of the backwashing, the high-pressure washing is omitted when the differential pressure $\Delta P$ between the filter internal-pressure $P_{in}$ displayed by the filter internal-pressure detection unit $S_{in}$ and the filter external-pressure $P_{out}$ displayed by the filter external-pressure detection unit $S_{out}$ is less than the predetermined value. When the differential pressure $\Delta P$ is less than the predetermined value during the high-pressure washing, the high-pressure washing may be stopped immediately.

The high-pressure washing is performed after the trapped materials trapped from the filtration surface side are removed by backwashing. If the high-pressure washing is performed before the backwashing, some of the trapped materials trapped from the filtration surface side are peeled off into the internal space F of the filter element 21, and fine particulate trapped materials (for example, of 200 μm or less) thereof float without settling. The fine particulate trapped materials may be trapped again by the filter element 21 from the filtration surface side by a filtering function, which makes it difficult to sufficiently restore filtration performance. For this reason, the fine particulate trapped materials are removed by the backwashing prior to the high-pressure washing.

Figure 9:
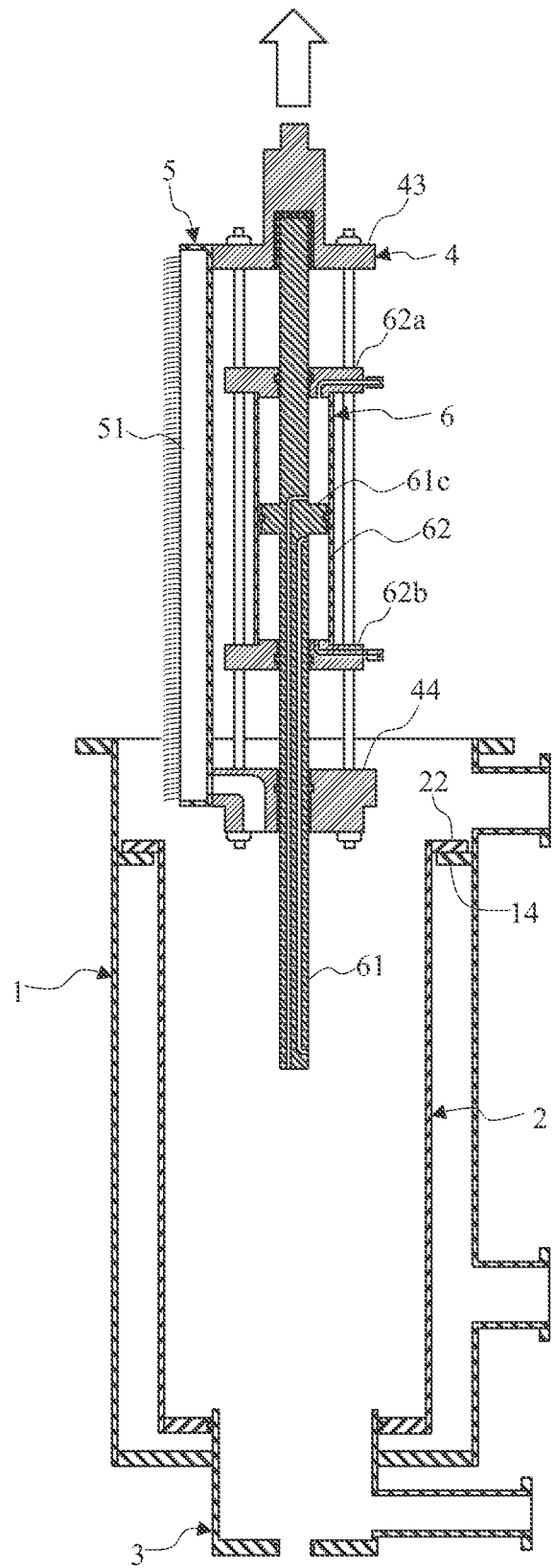
FIG. 9 is a cross-sectional view showing a partially disassembled state of the filtration apparatus.

Next, a method of attaching and detaching the backwashing mechanism 5 and the high-pressure washing mechanism 6 from the filtration apparatus will be described. With reference to FIG. 1, in a case of taking out the backwashing mechanism 5 and the high-pressure washing mechanism 6 after the drive source 41 is removed from the filtration apparatus by releasing the coupling of the output shaft 42 with the first end rotating body 43, the first casing lid plate 12 is removed, and an opening for taking out is provided in the casing 1. Then, the connection of the piston rod 61 with the first fluid supply pipe La and the second fluid supply pipe Lb is released, and the fixture 63 fixing the piston rod 61 to the backwashing drain case 3 is removed. Then, as shown in FIG. 9, the first end rotating body 43 is pulled out from the opening of the casing 1. Even in this way, the backwashing mechanism 5 and the high-pressure washing mechanism 6 do not fall off. This is because the backwashing head 51 is fixedly connected to the first end rotating body 43 or the second end rotating body 44, the movement of the movable cylinder 62 is restricted by the first end rotating body 43 and the second end rotating body 44, and the movement of the piston portion 61c is restricted between the first closing plug 62a and the second closing plug 62b. In this way, the backwashing mechanism 5 and the high-pressure washing mechanism 6 are removed from the filtration apparatus. In addition, the filter unit 2 is removed from the filtration apparatus in a manner of releasing the connection of the flange portion 22 and the partition plate 14 and pulling out the flange portion 22 from the opening of the casing 1. The backwashing mechanism 5, the high-pressure washing mechanism 6, and the filter unit 2 may be attached to the filtration apparatus in reverse order of the above-described procedure.

Figure 10:
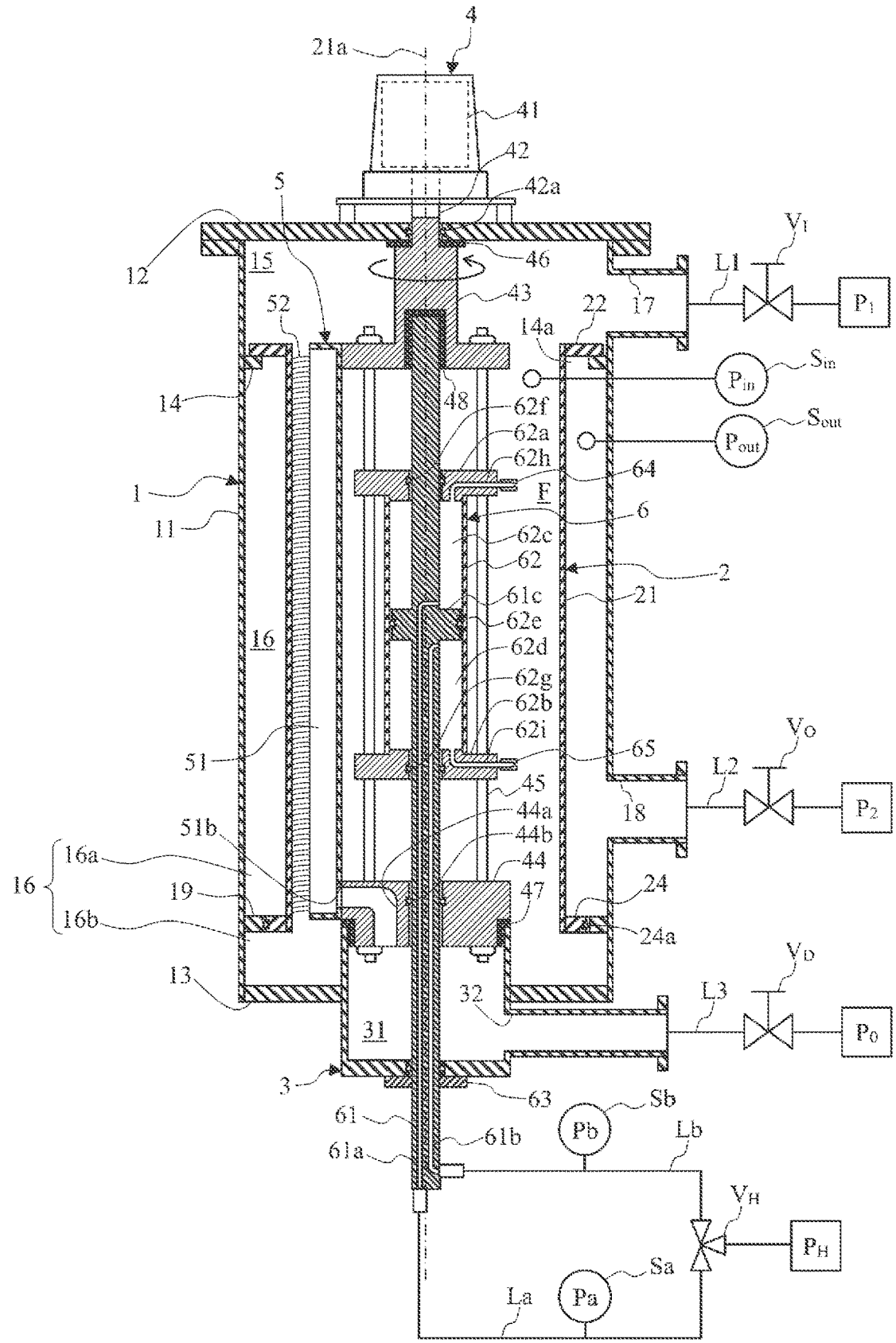
FIG. 10 is a central cross-sectional view showing a modification of the filtration apparatus.

FIG. 10 shows a modification of the filtration apparatus according to the first embodiment. The filtration chamber 16 is further partitioned into a first filtration chamber 16a and a second filtration chamber 16b by a partition plate 19 provided between the second casing lid plate 13 and the partition plate 14. In the first filtration chamber 16a, the filter element 21 is arranged. The first filtration chamber 16a communicates with the outside through the second port 18. The second filtration chamber 16b is connected to communicate with the other end of the filter element 21. A through hole of the partition plate 19 is fitted with a flange portion 24 formed radially over the entire circumference of the outer circumference of the other end of the filter element 21, whereby the filter element 21 is supported by the casing 1. A sealing member 24a such as an O-ring is provided between the through hole of the partition plate 19 and the flange portion 24 fitted into the through hole for the purpose of preventing fluid leakage.

According to the filtration apparatus of the modification, the other end of the filter element 21 is not closed by the filter lid plate 23, but is connected to communicate with the second filtration chamber 16b, so that the trapped materials peeled off and settled from the filter element 21 hardly float up by injection of high-pressure fluid from the second injection nozzle 65. Even in the filtration apparatus of the modification, the operation of attaching and detaching can be applied in the same manner described above, and the flow rate control valve $V_C$ can also be applied. The filter element 21 may be configured to block the outflow of the target fluid from the other end of the filter element 21 to the second port 18.

According to the filtration apparatus of the first embodiment, the backwashing mechanism 5 and the high-pressure washing mechanism 6 are attached to the rotary drive mechanism 4, and are rotatably arranged in the internal space F of the filter element 21. Therefore, compared with the conventional filtration apparatus in which the backwashing mechanism 5 and the high-pressure washing mechanism 6 are arranged outside the rotatable filter element 21, the diameter of the filtration apparatus can be reduced, and thus manufacturing costs can also be reduced.

In the filtration apparatus according to the first embodiment, the filtration direction of the filter element 21 is set to the direction from the inner circumferential surface toward the outer circumferential surface, and the backwashing mechanism 5 and the high-pressure washing mechanism 6 rotate. Therefore, compared with the conventional filtration apparatus in which the filtration direction of the filter element 21 is set to the direction from the outer circumferential surface toward the inner circumferential surface and the filter element 21 rotates, the filter element 21 can be improved in strength.

Furthermore, the filtration apparatus according to the first embodiment is configured in consideration of rotation of the backwashing mechanism 5 such that the backwashing fluid generated by the backwashing head 51 is discharged in the direction of the axial line 21a equal to the direction in which the backwashing mechanism 5 and the high-pressure washing mechanism 6 are removed. Therefore, compared with the conventional filtration apparatus in which the pipe for discharging the backwashing fluid is provided to penetrate the outer circumferential surface of the casing 1, the backwashing mechanism 5 and the high-pressure washing mechanism 6 can be easily removed, and the filtration apparatus can be improved in maintainability.

Second Embodiment

Figure 11:
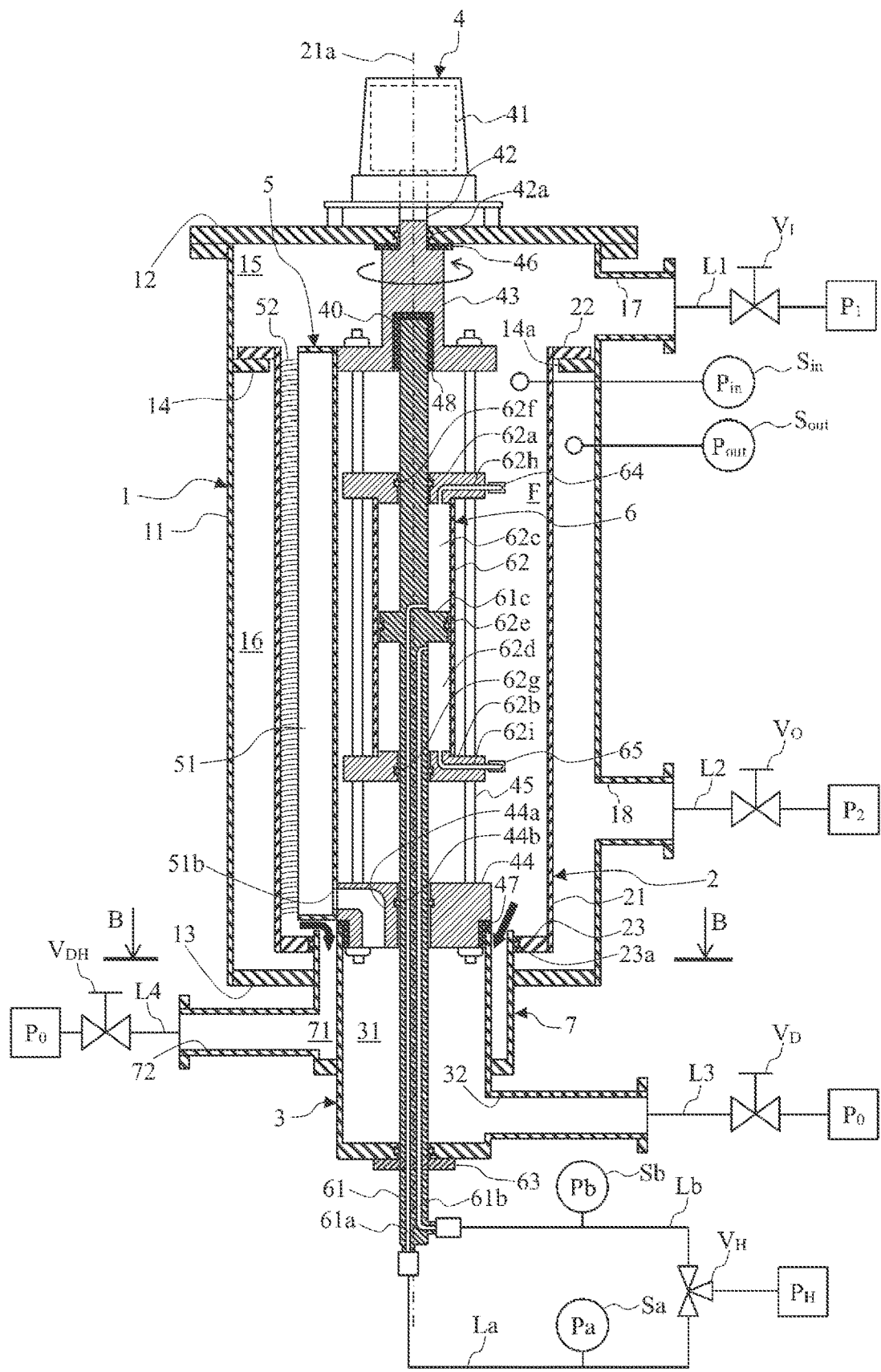
FIG. 11 is a central vertical cross-sectional view showing an example of a filtration apparatus according to a second embodiment.
Figure 12:
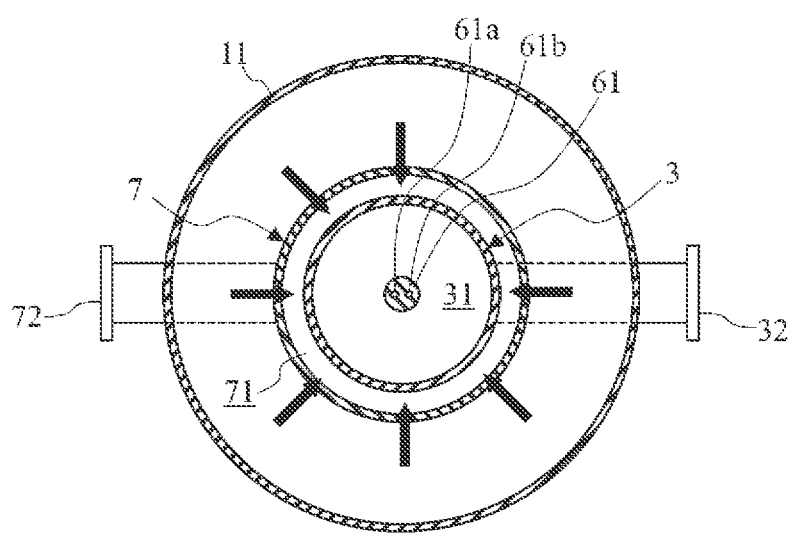
FIG. 12 is a transverse cross-sectional view taken along line B-B in FIG. 10.

FIGS. 11 and 12 shows an example of a filtration apparatus according to a second embodiment. In the present embodiment, differences from the first embodiment will be mainly described, and components similar to those of the filtration apparatus according to the first embodiment are denoted with the same reference numerals and description will be omitted for simplicity. The same applies to the following other embodiments.

As described in the first embodiment, when the backwashing is performed prior to the high-pressure washing, almost all fine particulate trapped materials trapped from the filtration surface side of the filter element 21 are removed together with the backwashing fluid. However, when the backwashing is insufficient, the fine particulate trapped materials may be peeled off by the high-pressure washing and remain in the internal space F of the filter element 21. Therefore, in consideration of the possibility that the trapped materials of the filter element 21 may be peeled off into the internal space F of the filter element 21 by the high-pressure washing, the filtration apparatus of the second embodiment further includes a path through which any such trapped materials are discharged.

The filtration apparatus includes a high-pressure washing drain case 7 that is fixed to the casing 1 and is a tubular body surrounding distantly from the outer circumferential surface of the backwashing drain case 3 so as to discharge the trapped materials, which have been peeled off during the high-pressure washing, to the outside. One end of the high-pressure washing drain case 7 is opened to the internal space F of the filter element 21, and the other end thereof penetrates the filter lid plate 23 and the second casing lid plate 13 in the direction of the axial line 21*a* and extends to the outside of the casing 1. The extension end is connected to the outer circumferential surface of the backwashing drain case 3, and therefore the other end of the high-pressure washing drain case 7 is closed. Thus, the backwashing drain case 3 is fixed to the casing 1 through the second casing lid plate 13 and the high-pressure washing drain case 7. Furthermore, one end of the high-pressure washing drain case 7 is fitted into the through hole of the filter lid plate 23, thereby supporting the filter element 21. Then, a high-pressure washing drain chamber 71 is formed in a space between the outer circumferential surface of the backwashing drain case 3 and the inner circumferential surface of the high-pressure washing drain case 7 to accommodate a fluid (hereinafter, referred to as "washing fluid") containing the trapped materials peeled off into the internal space F of the filter element 21 by the high-pressure washing. The high-pressure washing drain case 7 includes a high-pressure washing drain port 72 through which the high-pressure washing drain chamber 71 communicates with the outside of the filtration apparatus.

The inner circumferential surface of the through hole of the filter lid plate 23 and the outer circumferential surface of the high-pressure washing drain case 7 inserted thereinto are formed so as to be relatively rotatable around the axial line 21*a*. In addition, a sealing member 23*a* such as an O-ring is provided between the inner circumferential surface of the through hole of the filter lid plate 23 and the outer circumferential surface of the high-pressure washing drain case 7 inserted thereinto for the purpose of preventing fluid leakage.

The high-pressure washing drain port 72 of the high-pressure washing drain chamber 71 is connected to a washing fluid discharge pipe L4 configured to discharge the washing fluid accommodated in the high-pressure washing drain chamber 71. The washing fluid discharge pipe L4 is opened to a space of an ambient pressure $P_0$ such as an atmospheric pressure through a high-pressure washing drain valve $V_{DH}$ configured to open and close the pipeline on the way.

The high-pressure washing drain valve $V_{DH}$ is closed during the filtration and the backwashing, and is opened during the high-pressure washing. When the high-pressure washing drain valve $V_{DH}$ is opened during the high-pressure washing, the internal pressure of the high-pressure washing drain chamber 71 decreases. For this reason, some of the target fluids flowing into the fluid inflow chamber 15, and thus, the internal space F of the filter element 21, flows out to the high-pressure washing drain chamber 71, as a washing fluid (indicated by black arrows) containing the trapped materials peeled off into the internal space F of the filter element 21 by the high-pressure washing. Then, the washing fluid accommodated in the high-pressure washing drain chamber 71 is discharged from the high-pressure washing drain port 72 to the outside of the filtration apparatus through the washing fluid discharge pipe L4.

Figure 13:
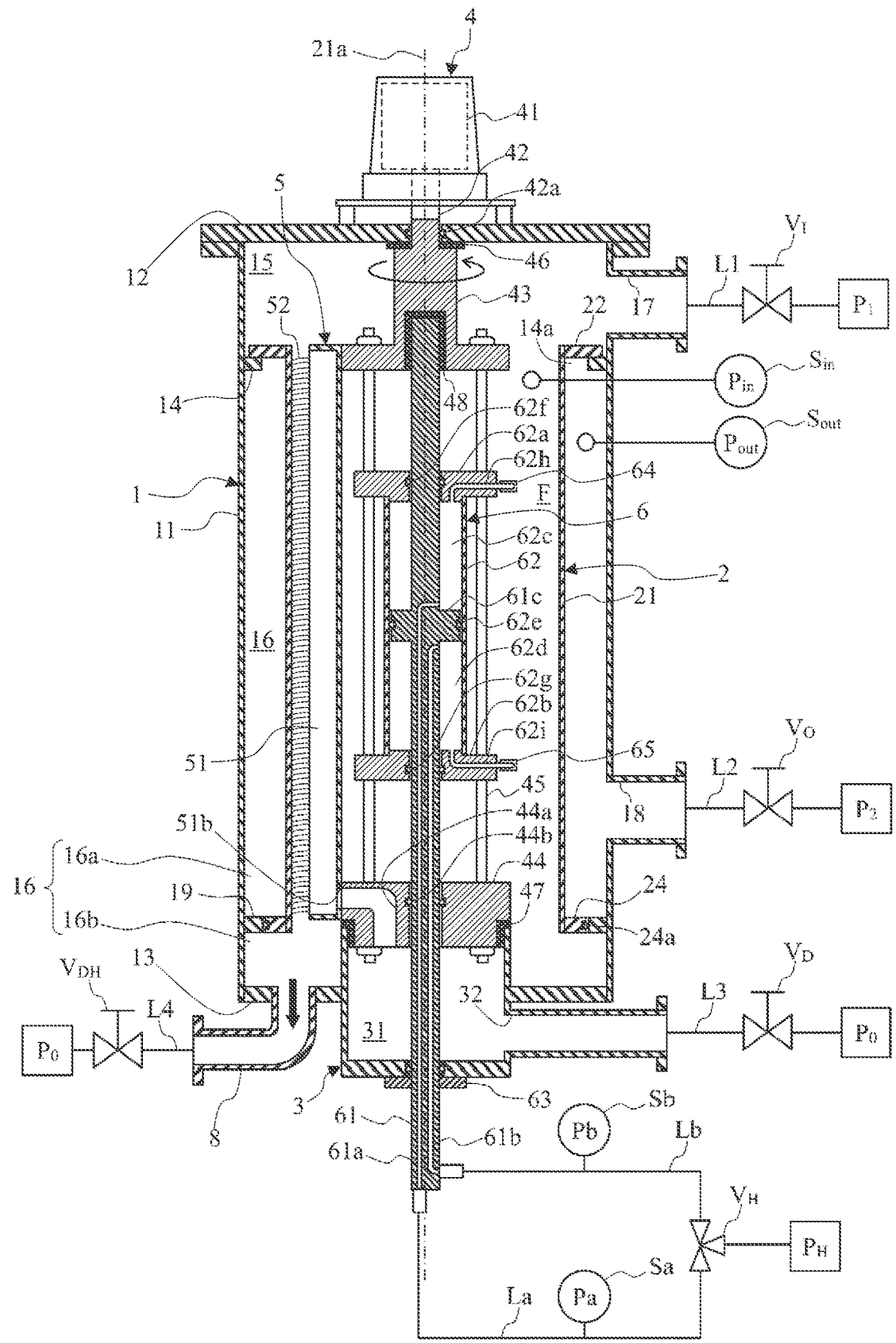
FIG. 13 is a central cross-sectional view showing a first modification of the filtration apparatus.

FIG. 13 shows a first modification of the filtration apparatus according to the second embodiment. This modification corresponds to a modification of the filtration apparatus shown in FIG. 10, which further includes a drain pipe 8 connected to communicate with the second filtration chamber 16*b*. Similar to the high-pressure washing drain port 72, the drain pipe 8 is connected to a washing fluid discharge pipe L4, and the washing fluid discharge pipe L4 is opened to a space of an ambient pressure $P_0$ such as an atmospheric pressure through a high-pressure washing drain valve $V_{DH}$ configured to open and close the pipeline on the way. Then, the washing fluid accommodated in the second filtration chamber 16*b* is discharged to the outside through the drain pipe 8 and the washing fluid discharge pipe L4.

Figure 14:
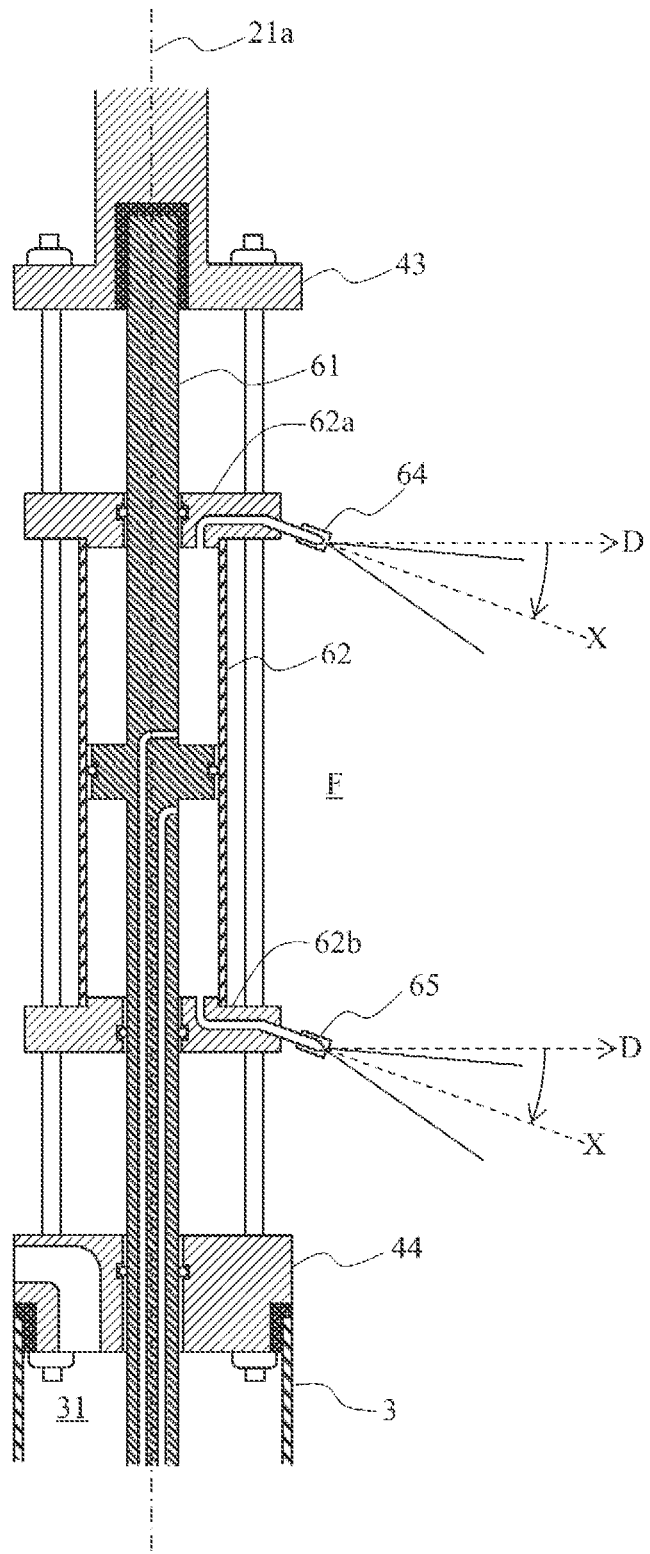
FIG. 14 is a partial central cross-sectional view showing a second modification of the filtration apparatus.

FIG. 14 shows a second modification of the filtration apparatus according to the second embodiment. In this modification, an injection axial-line X of each of the injection nozzles 64 and 65 in the filtration apparatuses shown in FIGS. 11 and 13 is inclined in a direction from the position of each of the injection nozzles 64 and 65 toward the position of the first drain case 3 with respect to a direction D orthogonal to the axial line 21*a*. Here, the injection axial-line X means a central axis of a jet flow in an advancing direction of the high-pressure fluid injected from each of the injection nozzles 64 and 65. In this way, when the injection axial-line X is inclined, fine particulate trapped materials peeled off into the internal space F from the filter element 21 by the high-pressure washing are relatively quickly guided to the high-pressure washing drain chamber 71 or the drain pipe 8.

According to the filtration apparatus of the second embodiment, the trapped materials peeled off from the filter element 21 by the high-pressure washing are discharged. Therefore, it is possible to achieve sufficient restoration of the filtration performance in addition to the reduction in diameter of the filtration apparatus, the reduction of manufacturing costs, the improvement in strength of the filter element 21, and the improvement of maintainability.

Third Embodiment

Figure 15:
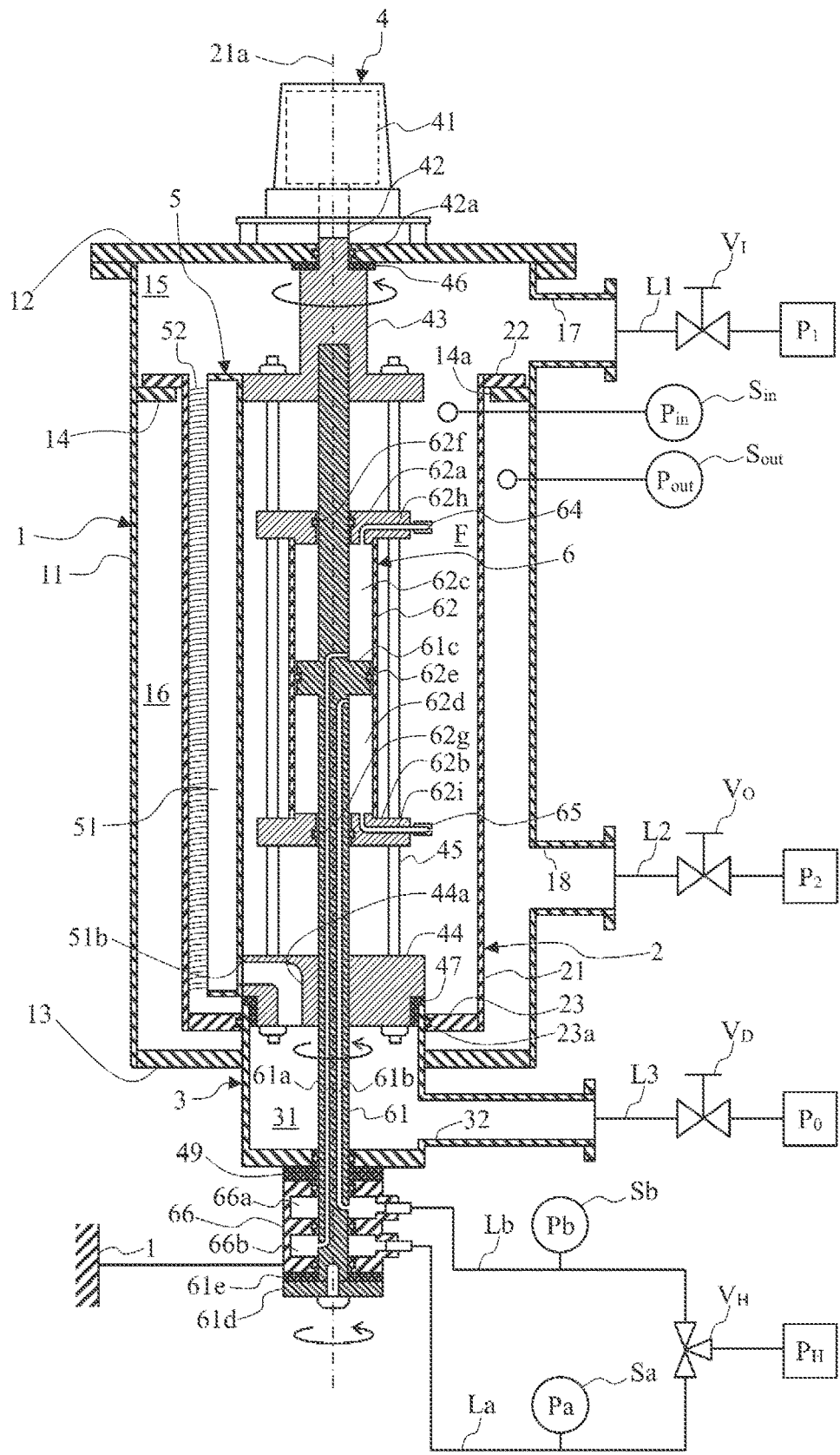
FIG. 15 is a central cross-sectional view showing an example of a filtration apparatus according to a third embodiment.

FIG. 15 shows an example of a filtration apparatus according to a third embodiment. The filtration apparatus of the present embodiment is different from the filtration apparatus of the first embodiment in that the piston rod 61 is fixed to the first end rotating body 43 and the second end rotating body 44 so as not to be relatively rotatable and rotates integrally with the rotary drive mechanism 4. For this reason, the following components in the first embodiment are omitted in the present embodiment. That is, the intermediate bearing 48 for supporting the piston rod 61 so as to be rotatable relative to the first end rotating body 43 and the fixture 63 for fixing the piston rod 61 to the backwashing drain case 3 are omitted. Furthermore, since the piston rod 61 is closely fixed to the inner circumferential surface of the through hole of the second end rotating body 44, the sealing member 44*b* between the second end rotating body 44 and the piston rod 61 is omitted.

An annular third bearing 49 is arranged and fixed around the through hole into which the piston rod 61 penetrates on an outer surface of the backwashing drain case 3, and the piston rod 61 is inserted into the third bearing 49 so as to be relatively rotatable around the axial line 21*a*. In addition, the piston rod 61 extends further to the outside from the third bearing 49, and is inserted into a rotary joint 66, which is a closed vessel used to supply a high-pressure fluid to the rotating piston rod 61, so as to be relatively rotatable around the axial line 21*a*, in a manner of fluid-tightness or airtightness. Then, a stopper 61*d* is detachably attached to the extension end of the piston rod 61, and an annular thrust bearing 61e, into which the piston rod 61 is inserted, is arranged between the stopper 61d and the rotary joint 66. Thereby, the movement of the rotary joint 66 in the direction of the axial line 21a is restricted between the third bearing 49 and the stopper 61d to prevent the rotary joint 66 from falling off.

The rotary joint 66 is fixed so as not to rotate relative to the casing 1. A first fluid supply pipe La and a second fluid supply pipe Lb are connected to the rotary joint 66. The internal space of the rotary joint 66 is partitioned into two parts of a first communication chamber 66a communicating with the first fluid supply pipe La and a second communication chamber 66b communicating with the second fluid supply pipe Lb, in a manner of fluid-tightness or airtightness. The first communication chamber 66a is configured so as to communicate with the first fluid supply path 61a regardless of the rotation angle of the piston rod 61, but so as not to communicate with the second fluid supply path 61b. Furthermore, the second communication chamber 66b is configured so as to communicate with the second fluid supply path 61b regardless of the rotation angle of the piston rod 61, but so as not to communicate with the first fluid supply path 61a.

For example, the internal space of the rotary joint 66 can be partitioned into two parts in the direction of the axial line 21a to form the first communication chamber 66a and the second communication chamber 66b. In this case, the first fluid supply path 61a is open at the position of the first communication chamber 66a in the direction of the axial line 21a, and the second fluid supply path 61b is open at the position of the second communication chamber 66b in the direction of the axial line 21a. Thereby, regardless of the rotation angle of the piston rod 61, the first communication chamber 66a always communicates with the first fluid supply path 61a, and the second communication chamber 66b always communicates with the second fluid supply path 61b.

In the filtration apparatus of the first embodiment, one end of the piston rod 61 is fixed to the backwashing drain case 3 by the fixture 63, and the other end of the piston rod 61 is supported so as to be rotatable relative to the first end rotating body 43 through the intermediate bearing 48. Therefore, the piston rod 61 of the first embodiment functions as a rotary joint that supplies the high-pressure fluid to the rotating movable cylinder 62. On the other hand, in the filtration apparatus of the third embodiment, since the piston rod 61 rotates integrally with the rotary drive mechanism 4, the rotary joint 66 is provided to supply the high-pressure fluid to the rotating piston rod 61.

In the case of removing the backwashing mechanism 5 and the high-pressure washing mechanism 6, the fixture 63 is removed in the first embodiment, but the stopper 61d needs to be removed in the third embodiment, which is different from the first embodiment. As for other steps, the backwashing mechanism 5, the high-pressure washing mechanism 6, and the filter unit 2 are removed from the filtration apparatus in the same manner as in the first embodiment. The flow rate control valve VC can also be applied in the same manner as in the first embodiment.

According to the filtration apparatus of the third embodiment, the piston rod 61 is fixed to the first end rotating body 43 and the second end rotating body 44 so as not to be relatively rotatable, and rotates integrally with the rotary drive mechanism 4. For this reason, between the piston rod 61 and the movable cylinder 62, linear sliding in the direction of the axial line 21a occurs, but rotational sliding does not occur. Therefore, as compared with the first embodiment, the wear period of the sealing members 62e, 62f, and 62g can be extended in particular. Accordingly, it is possible to achieve reduction in maintenance frequency of the filtration apparatus in addition to reduction in diameter of the filtration apparatus, reduction of manufacturing costs, improvement in strength of the filter element 21, and improvement of maintainability.

Fourth Embodiment

Figure 16:
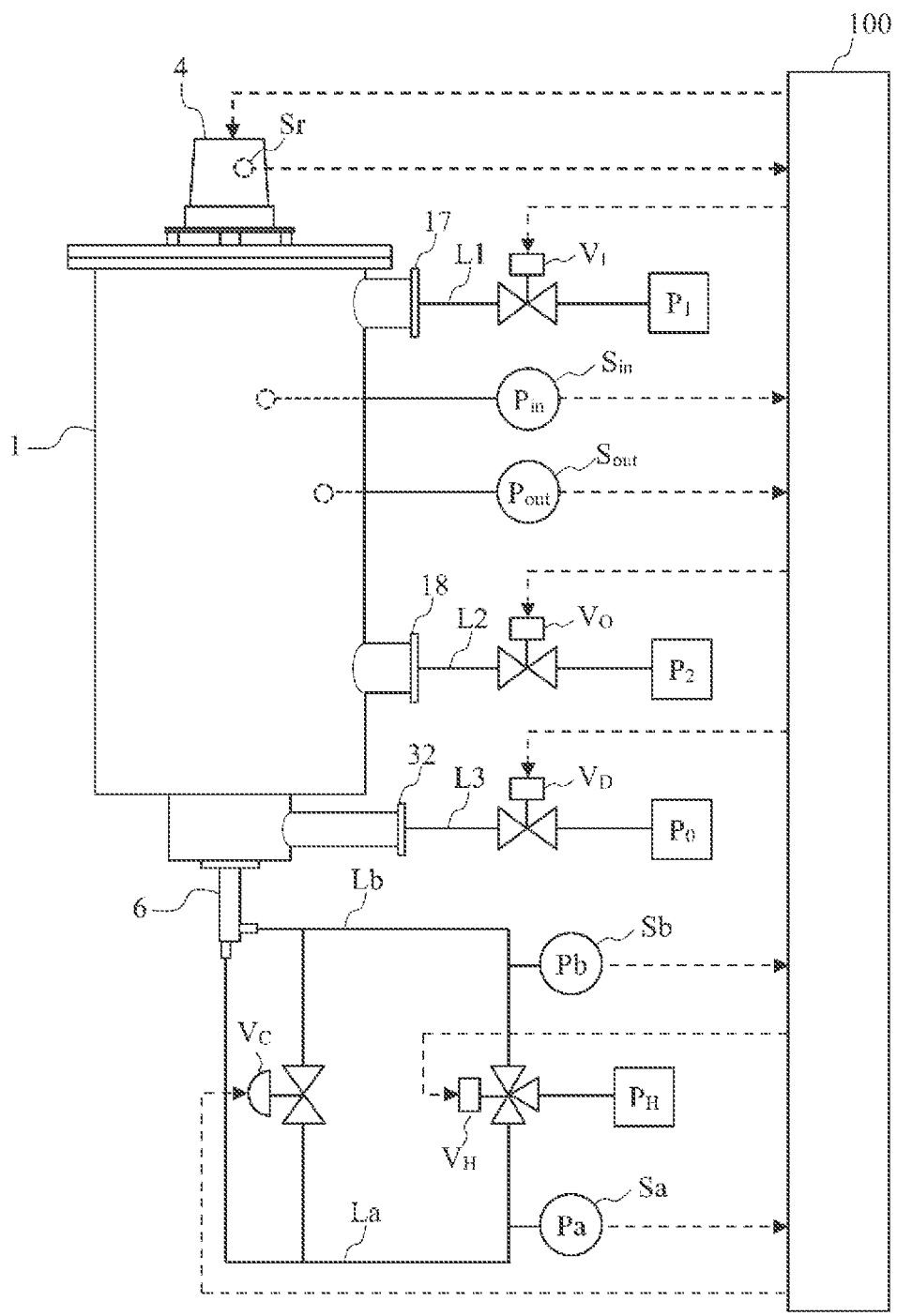
FIG. 16 is a schematic configuration diagram showing an example of a filtration apparatus according to a fourth embodiment.

FIG. 16 shows an example of a filtration apparatus according to a fourth embodiment. The filtration apparatus is the same as that of the first embodiment except that an operation is controlled by a control device 100.

In the present embodiment, all of the three-way valve $V_H$, the inflow valve $V_I$, the outflow valve $V_O$, and the backwashing drain valve $V_D$ are solenoid valves that can be controlled from the outside. Furthermore, the flow rate control valve $V_C$ is a control valve in which a passing flow rate changes according to an input current of a built-in solenoid. The flow rate control valve $V_C$ is also capable of being controllable from the outside. Furthermore, each of the filter internal-pressure detection unit $S_{in}$, the filter external-pressure detection unit $S_{out}$, the first fluid pressure detection unit Sa, and the second fluid pressure detection unit Sb is configured to output, to the outside, a signal related to each of the pressures to be detected.

The drive source 41 of the rotary drive mechanism 4 is configured to be controlled from the outside via various electric power devices, for example, a power relay or a power transistor interposed between the power source and the drive source 41, and an inverter for driving the drive source 41. The rotary drive mechanism 4 includes a rotation angle detection unit Sr configured to detect a rotation angle of the output shaft 42. As the rotation angle detection unit Sr, various rotation angle sensors, for example, a resolver, a rotary encoder, and a Hall element can be used.

The control device 100 inputs an output signal of each of the filter internal-pressure detection unit $S_{in}$, the filter external-pressure detection unit $S_{out}$, the first fluid pressure detection unit Sa, the second fluid pressure detection unit Sb, and the rotation angle detection unit Sr. Then, based on such output signals, the control device 100 controls the three-way valve $V_H$, the inflow valve $V_I$, the outflow valve $V_O$, the backwashing drain valve $V_D$, the flow rate control valve $V_C$, and the drive source 41 of the rotary drive mechanism 4. Thus, the control device 100 controls the operation of the filtration apparatus.

The control device 100 includes a microcomputer having a processor such as a CPU (Central Processing Unit). The microcomputer includes a ROM (Read Only Memory), a RAM (Random Access Memory), an input/output interface and the like that are connected to the processor in a communicable manner via internal buses. The control device 100 controls the operation of the filtration apparatus by software processing in which the processor of the microcomputer reads the operation control program of the filtration apparatus from the ROM into the RAM and executes the operation control program. The operation control of the filtration apparatus in the control device 100 does not exclude a case in which a part or all of the operation control is executed by a hardware configuration.

Figure 17:
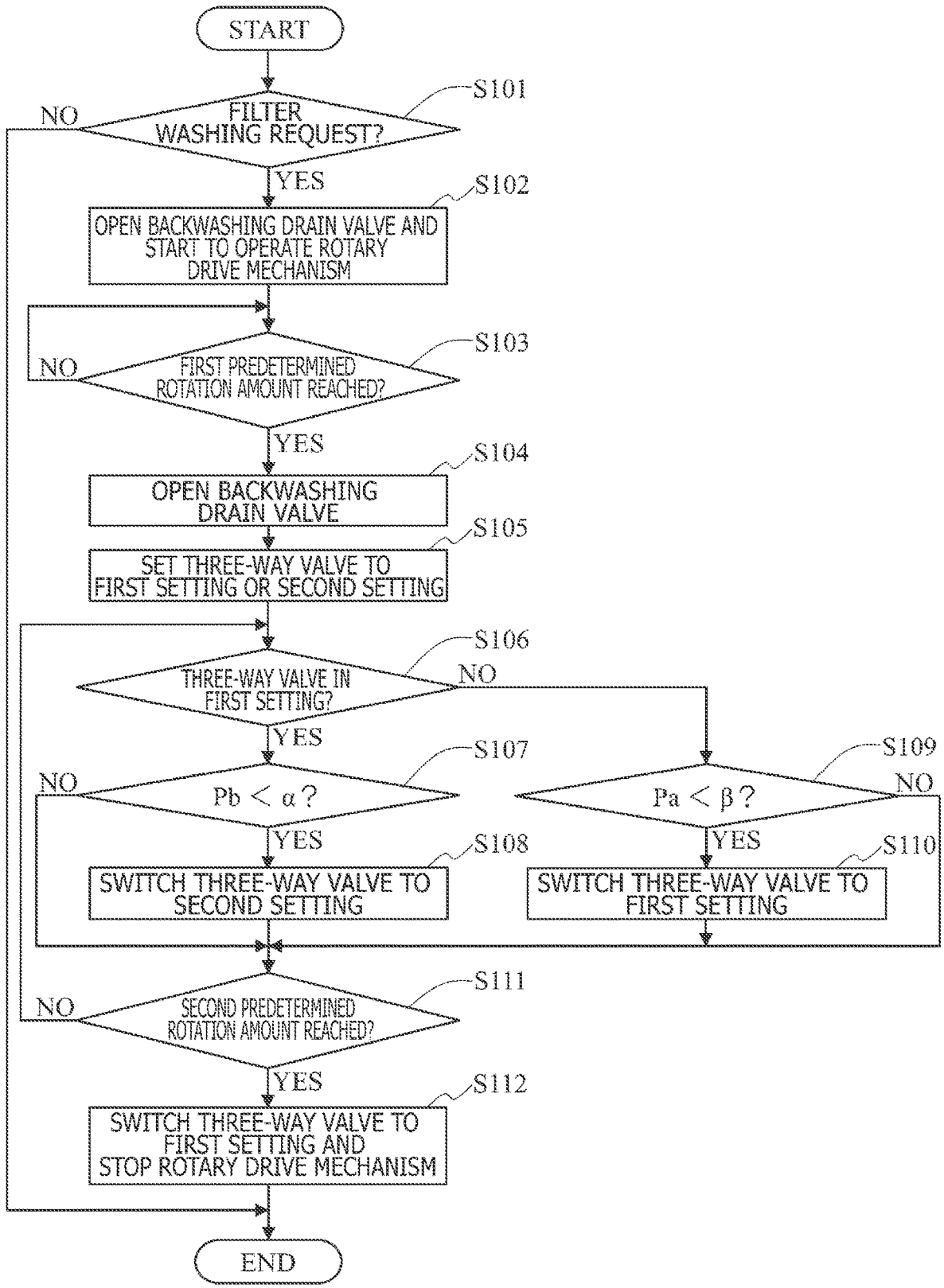
FIG. 17 is a flowchart showing an example of a filter washing process in the filtration apparatus.

FIG. 17 shows an example of a filter washing process that is repeatedly executed during filtration among various types of operation control of the filtration apparatus performed by the control device 100. During filtration, the control device 100 performs filtration setting. Specifically, the control device 100 opens the inflow valve $V_I$ and the outflow valve $V_O$ and closes the backwashing drain valve $V_D$ without operating the drive source 41 of the rotary drive mechanism 4. In addition, the control device 100 sets the three-way valve $V_H$ to the third setting so as not to supply the fluid to the movable cylinder 62. Filtration is performed by the filtration apparatus with such a setting.

In step S101 (abbreviated as "S101" in the drawing; the same applies hereinafter), the control device 100 determines whether there is a filter washing request. For example, the control device 100 may determine that there is a filter washing request when a filtration command signal is input via an input/output interface by a switch operation of the control device 100 or a signal output from a host control device or when a predetermined timing set in advance is reached. Then, when the control device 100 determines that there is a filter washing request (YES), the process proceeds to step S102, whereas when the control device 100 determines that there is no filter washing request (NO), the filter washing process is temporarily terminated, and the process of step S101 is executed again.

In step S102, the control device 100 opens the backwashing drain valve $V_D$ and causes the rotary drive mechanism 4 to start operating, thereby starting backwashing in the filtration apparatus. In order to effectively perform the backwashing, the control device 100 can start the backwashing when the amount of fluid in the filtration apparatus is equal to or greater than a certain level. For example, the control device 100 may start the backwashing when a liquid level in the filtration apparatus obtained from an output signal of a liquid level sensor (not shown) is equal to or greater than a value indicating that the liquid is full or the entire filter element 21 is immersed in the fluid.

In step S103, the control device 100 determines whether the rotation amount $\Delta\theta$ [rad] of the output shaft 42 after the start of backwashing reaches a first predetermined rotation amount $\theta 1$. The rotation amount $\Delta\theta$ of the output shaft 42 is obtained based on the output signal of the rotation angle detection unit Sr. Furthermore, the first predetermined rotation amount $\Delta\theta$ is a rotation amount $\Delta\theta$ in which almost all fine particulate trapped materials trapped from the filtration surface side of the filter element 21 are estimated to be peeled off by the backwashing, and it is preferably at least one rotation ($=2\pi$ [rad]). Then, when the control device 100 determines that the rotation amount $\Delta\theta$ of the output shaft 42 reaches the first predetermined rotation amount $\theta 1$ (YES), the process proceeds to step S104. On the other hand, when the control device 100 determines that the rotation amount $\Delta\theta$ of the output shaft 42 does not reach the first predetermined rotation amount $\theta 1$ (NO), the process of step S103 is executed again in order to continue the backwashing. Instead of the above process, the control device 100 may determine in step S103 whether the elapsed time from the start of backwashing reaches the time required for the rotation amount $\Delta\theta$ of the output shaft 42 to reach the first predetermined rotation amount $\theta 1$. The same applies to step S111 which is described below.

In step S104, the control device 100 closes the backwashing valve, thereby stopping the backwashing in the filtration apparatus.

In step S105, the control device 100 sets the three-way valve $V_H$ to either the first setting or the second setting in order to start the high-pressure washing. The control device 100 may fix the setting of the three-way valve $V_H$ at the start of the high-pressure washing to either the first setting or the second setting, but alternatively, can determine the current setting of the three-way valve $V_H$ according to the last setting of the three-way valve $V_H$ in the previous high-pressure washing. For example, when the last setting of the three-way valve $V_H$ in the previous high-pressure washing is the second setting, the current setting of the three-way valve $V_H$ may be the second setting. Information on the last setting of the three-way valve $V_H$ in the previous high-pressure washing is written and retained in a writable non-volatile memory such as a flash ROM of the control device 100.

When the high-pressure washing drain chamber 71 is provided as in the second embodiment, the control device 100 also opens, in step S105, the high-pressure washing valve $V_{DH}$ configured as a solenoid valve.

In step S106, when the control device 100 determines that the three-way valve $V_H$ is in the first setting (YES), the process proceeds to step S107, whereas when the control device 100 determines that the three-way valve $V_H$ is in the second setting (NO), the process proceeds to step S109.

In step S107, the control device 100 determines whether the fluid pressure Pb of the second fluid supply path 61b acquired based on the output signal of the second fluid pressure detection unit Sb is less than a predetermined value $\alpha$. The predetermined value $\alpha$ is the fluid pressure Pb of the second fluid supply path 61b when the first closing plug 62a is estimated to come into contact with the first end rotating body 43. Then, when the control device 100 determines that the fluid pressure Pb of the second fluid supply path 61b is less than the predetermined value $\alpha$ (YES), the process proceeds to step S108, and the three-way valve $V_H$ is switched from the first setting to the second setting. On the other hand, when the control device 100 determines that the fluid pressure Pb of the second fluid supply path 61b is equal to or greater than the predetermined value $\alpha$ (NO), the process proceeds to step S111 without executing the process of step S108, thereby the first setting is maintained.

In step S109, the control device 100 determines whether the fluid pressure Pa of the first fluid supply path 61a acquired based on the output signal of the first fluid pressure detection unit Sa is less than a predetermined value $\beta$. The predetermined value $\beta$ is the fluid pressure Pa of the first fluid supply path 61a when the second closing plug 62b is estimated to come into contact with the second end rotating body 44. The predetermined value $\beta$ may be equal to the predetermined value $\alpha$. Then, when the control device 100 determines that the fluid pressure Pa of the first fluid supply path 61a is less than the predetermined value $\beta$ (YES), the process proceeds to step S110, and the three-way valve $V_H$ is switched from the second setting to the first setting. On the other hand, when the control device 100 determines that the fluid pressure Pa of the first fluid supply path 61a is equal to or greater than the predetermined value $\beta$ (NO), the process proceeds to step S111 without executing the process of step S110, thereby the second setting is maintained.

In step S111, the control device 100 determines whether the rotation amount $\Delta\theta$ [rad] of the output shaft 42 after the start of high-pressure washing reaches a second predetermined rotation amount $\theta 2$. The rotation amount $\Delta\theta$ of the output shaft 42 is obtained based on the output signal of the rotation angle detection unit Sr. In addition, the second predetermined rotation amount $\theta 2$ is a value set in advance such that the fluid can be injected onto the entire region of the filtration surface. For example, when the set moving speed u and the set rotating speed co satisfy the above relational expression, the second predetermined rotation amount $\theta 2$ can be set as $(q \times 2\pi)$ [rad]. Then, when the control device 100 determines that the rotation amount $\Delta\theta$ of the output shaft 42 reaches the second predetermined rotation amount θ2 (YES), the process proceeds to step S112. On the other hand, when the control device 100 determines that the rotation amount Δθ of the output shaft 42 does not reach the second predetermined rotation amount θ2 (NO), the process returns to step S106 in order to continue the high-pressure washing.

In step S112, the control device 100 sets the three-way valve $V_H$ to the third setting, and stops the rotary drive mechanism 4, thereby stopping the high-pressure washing in the filtration apparatus. Accordingly, the filter washing process is completed.

When the high-pressure washing drain chamber 71 is provided as in the second embodiment, the control device 100 also closes, in step S112, the high-pressure washing valve $V_{DH}$ configured as a solenoid valve.

Figure 18:
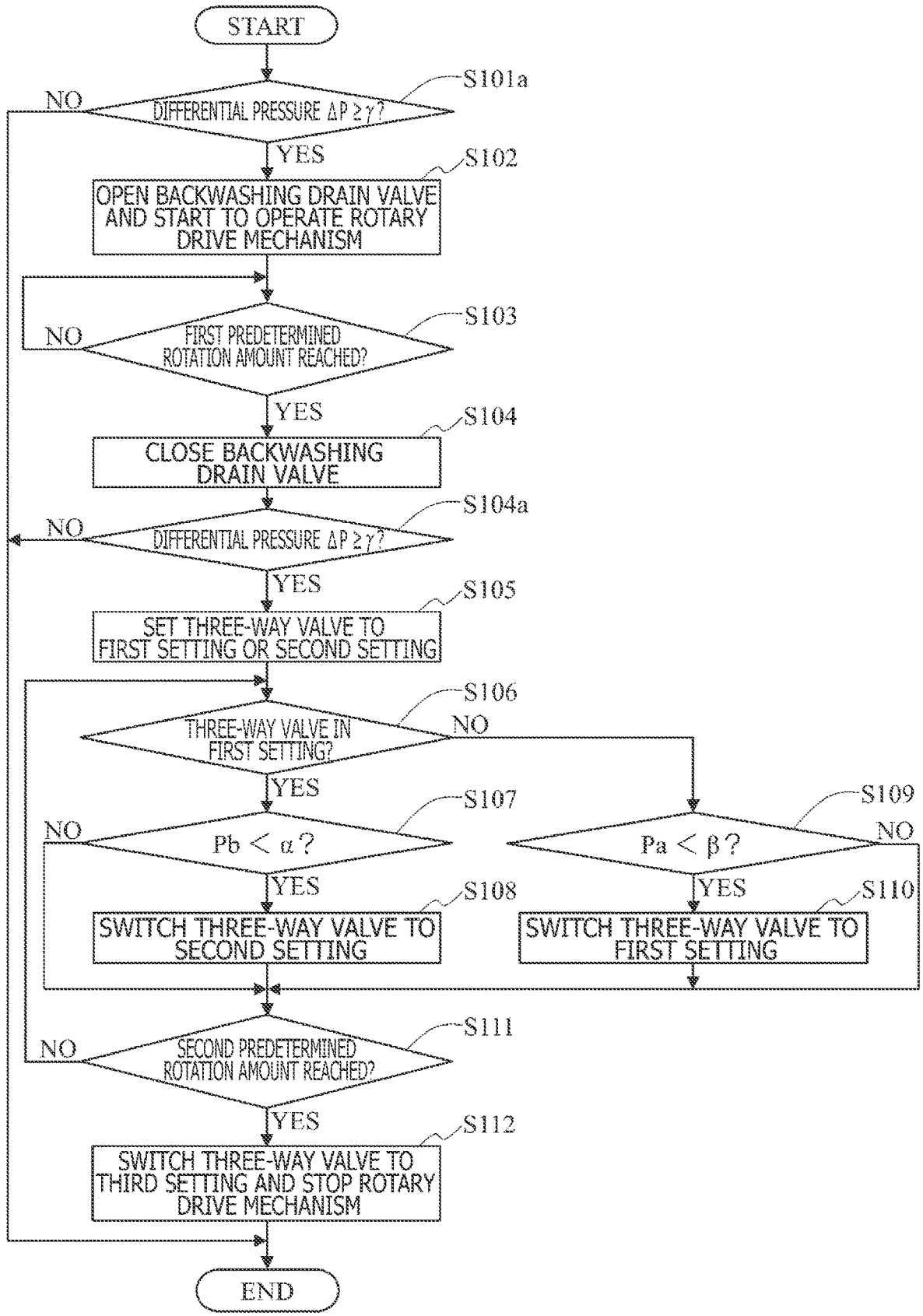
FIG. 18 is a flowchart showing a first modification of the filter washing process in FIG. 14.

FIG. 18 shows a first modification of the filter washing process shown in FIG. 17. In the present modification, the filter washing process is similar to the filter washing process shown in FIG. 17 except for steps S101a and S104a, and thus, the same steps as the filter washing process of FIG. 17 are denoted by the same step numbers and description will be omitted for simplicity.

In step S101a, the control device 100 obtains the differential pressure ΔP between the filter internal-pressure $P_{in}$ and the filter external-pressure $P_{out}$ and determines whether the differential pressure ΔP is equal to or greater than a predetermined value γ, instead of determining whether there is the filter washing request as in step S101 of FIG. 17. The filter internal-pressure $P_1$ is obtained based on the output signal of the filter internal-pressure detection unit $S_{in}$, and the filter external-pressure $P_{out}$ is obtained based on the output signal of the filter external-pressure detection unit $S_{out}$. Furthermore, the predetermined value γ is a differential pressure ΔP indicating the resistance to filtration when it is estimated that the filter element 21 needs to be washed from the viewpoint of filtration performance. Then, when the control device 100 determines that the differential pressure ΔP is equal to or greater than the predetermined value γ (YES), the process proceeds to step S102, whereas when the control device 100 determines that the differential pressure ΔP is less than the predetermined value γ (NO), the filter washing process is temporarily finished, and the process of step S101a is executed again. By determination of whether to start the filter washing based on the differential pressure ΔP in this way, filter washing can be started at an appropriate timing according to the actual trapped state of the filter element 21.

The process of step S101a can also be executed in combination with the process of step S101. For example, in order to prevent power consumption and fluid consumption required for filter washing, the process of step S101a may be further executed when it is determined in step S101 that there is the filter washing request. Alternatively, in order to prevent the deterioration of the filtration performance, the process of step S101a may be executed even when it is determined in step S101 that there is no filter washing request.

The control device 100 executes a process of step S104a before performing the high-pressure washing in step S105 after stopping the backwashing in step S104. In step S104a, the control device 100 determines whether the differential pressure ΔP is equal to or greater than the predetermined value γ. Then, when the control device 100 determines that the differential pressure ΔP is equal to or greater than the predetermined value γ (YES), the process proceeds to step S105, whereas when the control device 100 determines that the differential pressure ΔP is less than the predetermined value γ (NO), the filter washing process is temporarily terminated, and the process of step S101a is executed again. In this way, since the necessity of the start of high-pressure washing is determined based on the differential pressure ΔP after the backwashing and before the high-pressure washing, when it is estimated that the filtration performance is improved by the backwashing, the high-pressure washing is not performed, and thus wasteful power consumption and fluid consumption required for the high-pressure washing can be reduced.

In the present modification, either the replacement of step S101 with step S101a or the addition of step S104a between step S104 and step S105 may be reflected.

Figure 19:
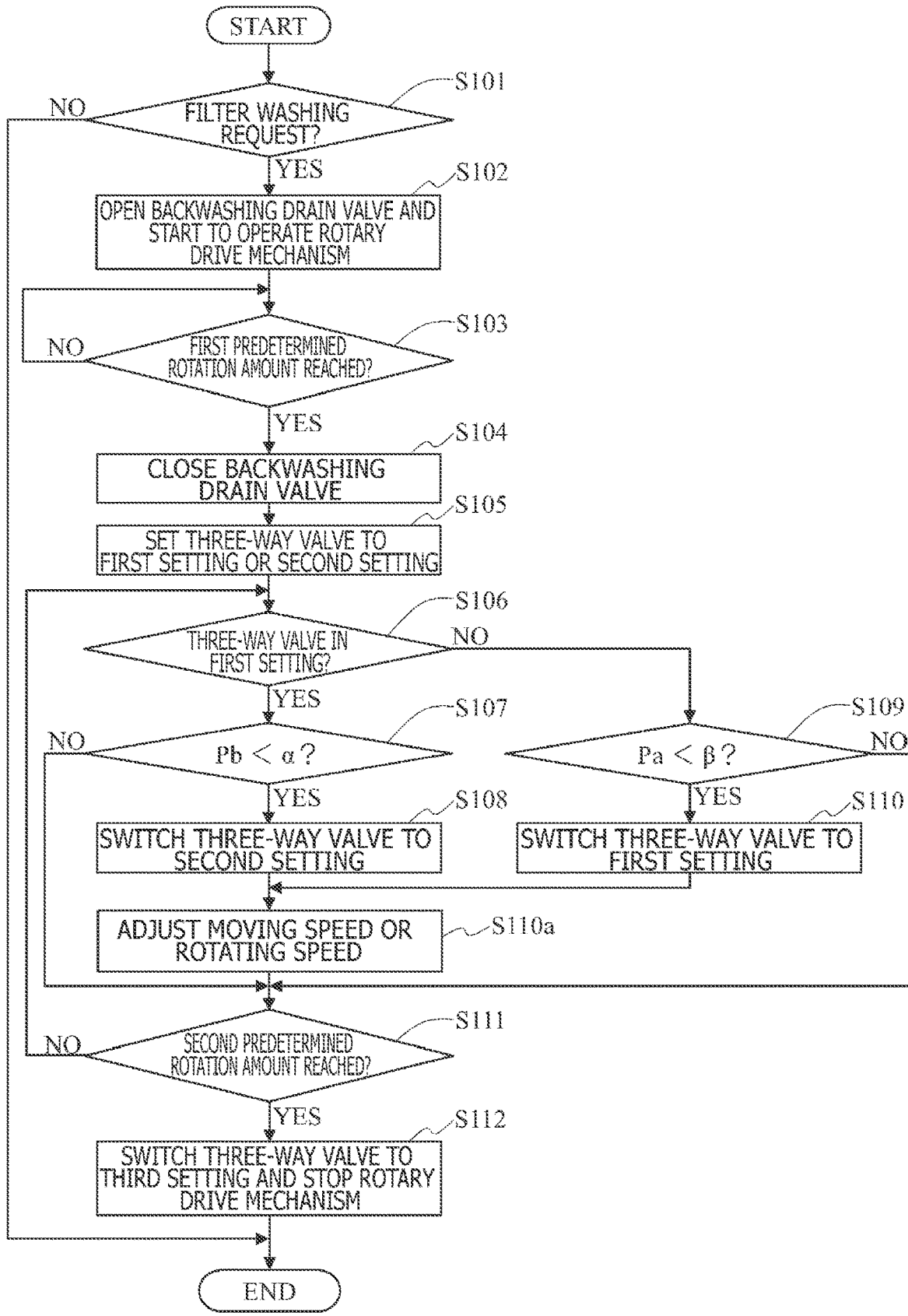
FIG. 19 is a flowchart showing a second modification of the filter washing process in FIG. 14.

FIG. 19 shows a second modification of the filter washing process shown in FIG. 17. In the present modification, the filter washing process is similar to the filter washing process shown in FIG. 17, except for step S110a, and thus, the same steps as the filter washing process of FIG. 17 are denoted by the same step numbers and description will be omitted for simplicity.

After switching the setting of the three-way valve $V_H$ in step S108 or step S110, the control device 100 adjusts the moving speed or the rotating speed in step S110a before executing the process of step S111. Specifically, the control device 100 adjusts the moving speed of the rotating speed of the movable cylinder 62 based on comparison of an elapsed time Δt elapsed from the previous setting switching to the current setting switching of the three-way valve $V_H$ with a half-cycle time $T_{half}$(L/u) obtained from the set moving speed u. When the half-cycle time $T_{half}$ is greater than the elapsed time Δt, the actual moving speed of the movable cylinder 62 is lower than the set moving speed u. Therefore, when the speed of the drive source 41 can be controlled, the control device 100 controls the drive source 41 to reduce the rotating speed according to the amount of deviation of the moving speed so as to satisfy the above relational expression, for example. On the other hand, when the half-cycle time $T_{half}$ is less than the elapsed time Δt, the actual moving speed of the movable cylinder 62 is greater than the set moving speed u. Therefore, the control device 100 slightly opens the flow rate control valve $V_C$ to reduce the moving speed so as to satisfy the above relational expression, for example. Alternatively, when the speed of the drive source 41 can be controlled, the control device 100 controls the drive source 41 to increase the rotating speed according to the amount of deviation of the moving speed so as to satisfy the above relational expression, for example.

According to the filtration apparatus of the fourth embodiment, the control device 100 automatically performs the filter washing process in the order of the backwashing and the high-pressure washing, and fine trapped particulate materials are hardly peeled off into the internal space F of the filter element 21. Therefore, it is possible to achieve sufficient restoration of filtration performance in addition to the reduction in diameter of the filtration apparatus, the reduction of manufacturing costs, the improvement in strength of the filter element 21, and the improvement of maintainability.

In the above-described first to fourth embodiments, during the high-pressure washing, when the filtering function is not necessary to be activated, for example, during periodic maintenance of the filtration apparatus, the fluid in the filtration apparatus may be discharged to the outside in the state in which the inflow valve $V_I$ and the backwashing drain valve $V_D$ are closed and the outflow valve $V_O$ is opened. In this case, even when the trapped materials trapped from the filtration surface side are peeled off by the high-pressure washing, the fine particulate trapped materials do not float in the internal space F of the filter element 21, and thus, it is not necessary to perform the backwashing before the high-pressure washing.

In addition, the high-pressure washing is performed after the backwashing as described above, but the backwashing may be performed during the high-pressure washing. When the backwashing is performed during the high-pressure washing, the fine particulate trapped materials peeled off into the internal space F of the filter element 21 by the high-pressure washing are trapped again by the filter element 21, and can be discharged to the outside by the backwashing.

The high-pressure washing mechanism 6 is not limited to a configuration in which the movable cylinder 62 is reciprocated using the injection fluid of high-pressure injection, may be any mechanism as long as it is capable of reciprocating from one end to the other end of the filter element 21. For example, the first injection nozzle 64 and the second injection nozzle 65 may be reciprocated using an air cylinder or a motor-driven feed screw mechanism.

An example of the injection fluid for the high-pressure washing includes the clean fluid, but it may include a filtered fluid, without being limited thereto. The filtered fluid may contain the trapped materials removed by the high-pressure washing. However, these trapped materials are mainly trapped from the anti-filtration surface side during backwashing after passing through the filter element 21 during filtration. Therefore, even when the filtered fluid is used as the injection fluid for the high-pressure washing, there is a possibility that the fluid will pass through the filter element 21 again during filtration, so there is no particular problem.

The inside of the casing 1 is partitioned into the fluid inflow chamber and the filtration chamber, but the fluid inflow chamber may not be provided. In this case, the target fluid may flow directly into the internal space F of the filter element 21 from the outside.

The movable cylinder 62 includes, attached thereto, two injection nozzles of the first injection nozzle 64 communicating with the first fluid chamber 62c and the second injection nozzle 65 communicating with the second fluid chamber 62d, but the number of injection nozzles is not limited. In other words, at least one of the number of injection nozzles communicating with the first fluid chamber 62c and the number of injection nozzles communicating with the second fluid chamber 62d may be multiple. For example, two injection nozzles communicating with the first fluid chamber 62c and two injection nozzles communicating with the second fluid chamber 62d can be attached at an angle so as not to interfere with the backwashing head 51 around the axial line 21a.

The installation posture of the filtration apparatus is not particularly limited, but for example, the filtration apparatus can be installed such that the axial line 21a is in a vertical direction, or the filtration apparatus can be installed such that the axial line 21a is in a horizontal direction.

Although the contents of the present invention have been specifically described with reference to the preferred embodiments, it will be obvious to those skilled in the art that various modifications may be adopted based on the basic technical concept and teachings of the present invention. In addition, the technical concepts described in the first to fourth embodiments can be used appropriately in combination as long as they do not conflict with each other.

REFERENCE SYMBOL LIST 1 casing
2 filter unit
3 backwashing drain case
4 rotary drive mechanism
15 fluid inflow chamber
5 backwashing mechanism
6 high-pressure washing mechanism
7 high-pressure washing drain case
8 drain pipe
16 filtration chamber
16a first filtration chamber
16b second filtration chamber
17 first port
18 second port
21 filter element
21a axial line of filter element
23 filter lid plate
41 drive source
43 first end rotating body
44 second end rotating body
44a backwashing fluid discharge path
45 coupling shaft
51 backwashing head
51a drawing hole
61 piston rod
61a first fluid supply path
61b second fluid supply path
61c piston portion
62 movable cylinder
62a first closing plug
62b second closing plug
62c first fluid chamber
62d second fluid chamber
64 first injection nozzle
65 second injection nozzle
66 rotary joint
100 control device
F internal space of filter element
$V_C$ flow rate control valve
$P_{in}$ filter internal-pressure
$P_{out}$ filter external-pressure
$\Delta P$ differential pressure
u set moving speed
ω set rotating speed

The invention claimed is:

1. A filtration apparatus comprising:
a casing that is partitioned into a fluid inflow chamber including a first port, through which a target fluid flows in from the outside, and a filtration chamber configured to filter the target fluid and including a second port through which a filtered fluid, after filtration, flows out to the outside;
a filter element arranged in the filtration chamber and formed in a cylindrical shape with one end and another end to filter the target fluid guided from the fluid inflow chamber, which is connected to communicate with the one end, in such a manner that the target fluid passes in a direction from an inner circumferential surface toward an outer circumferential surface, and to block an outflow of the target fluid from the other end toward the second port;
a backwashing mechanism that performs backwashing by drawing the filtered fluid in a direction from the outer circumferential surface toward the inner circumferential surface of the filter element;
a high-pressure washing mechanism that performs high-pressure washing by injecting a high-pressure fluid so as to pass through the filter element in the direction from the inner circumferential surface toward the outer circumferential surface of the filter element; and a rotary drive mechanism, to which the backwashing mechanism and the high-pressure washing mechanism are attached, and which rotates the backwashing mechanism and the high-pressure washing mechanism around an axial line of the filter element in an internal space of the filter element communicating with the fluid inflow chamber, wherein the high-pressure washing mechanism includes: a movable cylinder that is movable in the direction of the axial line and is rotatable around the axial line; a piston rod including a piston portion, which is accommodated in the movable cylinder and is not movable in the direction of the axial line, and two fluid supply paths that supply the high-pressure fluid to a first fluid chamber and a second fluid chamber, which are partitioned in the internal space of the movable cylinder by the piston portion, from the outside, respectively; and a plurality of injection nozzles that are provided in the movable cylinder to inject the high-pressure fluid to the outside in a state in which one or more of the injection nozzles communicate with the first fluid chamber, and the other one or more of the injection nozzles communicate with the second fluid chamber, and the high-pressure washing mechanism is configured such that the movable cylinder reciprocates in the direction of the axial line by sequentially switching the fluid supply path that supplies the high-pressure fluid out of the two fluid supply paths, and wherein the filtration apparatus further includes a flow rate control valve that is provided on a shunt path, at which the two fluid supply paths are shunted, and is capable of supplying some of the high-pressure fluids from one fluid supply path, which supplies the high-pressure fluid, out of the two fluid supply paths to the other fluid supply path.

2. The filtration apparatus according to claim 1, wherein the filter element is laminated in a plurality of layers, and an innermost layer on the inner circumferential surface side of the filter element has a finest mesh.

3. The filtration apparatus according to claim 1, wherein the rotary drive mechanism includes a first end rotating body coupled to a drive source, a second end rotating body apart from the first end rotating body in the direction of the axial line, and a coupling shaft that couples the first end rotating body extending in the direction of the axial line to the second end rotating body, and the movable cylinder has both ends that are closed by closing plugs through which the coupling shaft is inserted, and is movable in the direction of the axial line between the first end rotating body and the second end rotating body.

4. The filtration apparatus according to claim 3, wherein the piston rod extends in the direction of the axial line to be inserted into the movable cylinder so as to be rotatable and movable relative to the movable cylinder, to be supported by the first end rotating body so as to be rotatable relative to the first end rotating body, to penetrate the second end rotating body so as to be rotatable relative to the second end rotating body, and to be fixed to the casing.

5. The filtration apparatus according to claim 3, wherein the piston rod extends in the direction of the axial line to be inserted into the movable cylinder so as to be movable relative to the movable cylinder, to be fixed to the first end rotating body and the second end rotating body so as not to be rotatable relative to the first end rotating body and the second end rotating body, and to penetrate the casing so as to be rotatable relative to the casing, and a rotary joint configured to supply the high-pressure fluid to the two fluid paths from the outside is provided at an extension end of the piston rod penetrating and extending outward from the casing.

6. The filtration apparatus according to claim 3, wherein the other end of the filter element is closed with a lid plate, a first drain case, which penetrates the casing and the lid plate and opens to the internal space, is fixed to the casing, the second end rotating body is rotatably supported by an opening of the first drain case, and the filter element is supported by the first drain case when the first drain case is fitted into a through hole of the lid plate, and a backwashing fluid generated when the filtered fluid passes through the filter element by the backwashing is discharged to the first drain case through an internal passage of the second end rotating body.

7. The filtration apparatus according to claim 6, wherein a second drain case, which surrounds at a distance from an outer circumferential surface of the first drain case, penetrates the casing and the lid plate, and opens to the internal space, is fixed to the casing, the filter element is supported by the second drain case which, instead of the first drain case, is fitted into the through hole of the lid plate, and a washing fluid generated by the high-pressure washing is discharged to the second drain case through an opening of the second drain case.

8. The filtration apparatus according to claim 3, wherein the filtration chamber is partitioned into a first filtration chamber and a second filtration, the first filtration chamber including the filter element arranged therein and communicating with the outside through the second port, the second filtration chamber being connected to communicate with the other end of the filter element, a first drain case, which penetrates the casing and opens to the internal space or the second filtration chamber, is fixed to the casing, the second end rotating body is rotatably supported by an opening of the first drain case, and a backwashing fluid generated when the filtered fluid passes through the filter element by the backwashing is discharged to the first drain case through an internal passage of the second end rotating body.

9. The filtration apparatus according to claim 8, further comprising: a drain pipe connected to communicate with the second filtration chamber.

10. The filtration apparatus according to claim 1, further comprising: a control device configured to control the backwashing mechanism, the high-pressure washing mechanism, and the rotary drive mechanism, wherein the control device causes the backwashing mechanism to perform the backwashing, and then causes the high-pressure washing mechanism to perform the high-pressure washing.

11. The filtration apparatus according to claim 10, wherein the control device does not perform the high-pressure washing when a differential pressure between a pressure on the inner circumferential surface side and a pressure on the outer circumferential surface side of the filter element is less than a predetermined value.

12. The filtration apparatus according to claim 10, wherein
the control device adjusts a moving speed of the injection nozzle in the direction of the axial line of the filter element or a rotary speed of the rotary drive mechanism during the high-pressure washing.

13. A filtration apparatus comprising:
a casing that is partitioned into a fluid inflow chamber including a first port, through which a target fluid flows in from the outside, and a filtration chamber configured to filter the target fluid and including a second port through which a filtered fluid after filtration flows out to the outside;
a filter element arranged in the filtration chamber and formed in a cylindrical shape with one end and another end to filter the target fluid guided from the fluid inflow chamber, which is connected to communicate with the one end, in such a manner that the target fluid passes in a direction from an inner circumferential surface toward an outer circumferential surface, and to block an outflow of the target fluid from the other end toward the second port;
a backwashing mechanism that performs backwashing by drawing the filtered fluid in a direction from the outer circumferential surface toward the inner circumferential surface of the filter element;
a high-pressure washing mechanism that performs high-pressure washing by injecting a high-pressure fluid so as to pass through the filter element in the direction from the inner circumferential surface toward the outer circumferential surface of the filter element;
a rotary drive mechanism that includes, attached thereto, the backwashing mechanism and the high-pressure washing mechanism and rotates the backwashing mechanism and the high-pressure washing mechanism around an axial line of the filter element in an internal space of the filter element communicating with the fluid inflow chamber;
a first discharge path that communicates with the internal space through the other end of the filter element and discharges a backwashing fluid generated by the backwashing when the filtered fluid passes through the filter element; and
a second discharge path that communicates with the internal space through the other end of the filter element and discharges a washing fluid generated by the high-pressure washing, wherein
the high-pressure washing mechanism includes: a movable cylinder that is movable in the direction of the axial line and is rotatable around the axial line; a piston rod including a piston portion, which is accommodated in the movable cylinder and is not movable in the direction of the axial line, and two fluid supply paths that supply the high-pressure fluid to a first fluid chamber and a second fluid chamber, which are partitioned in the internal space of the movable cylinder by the piston portion, from the outside, respectively; and a plurality of injection nozzles that are provided in the movable cylinder to inject the high-pressure fluid in a state in which one or more of the injection nozzles communicate with the first fluid chamber, and the other one or more of the injection nozzles communicate with the second fluid chamber, and the high-pressure washing mechanism is configured such that the movable cylinder is configured to reciprocate in the direction of the axial line by sequentially switching the fluid supply path that supplies the high-pressure fluid out of the two fluid supply paths, and
an injection axial-line of the injection nozzle is inclined in a direction from a position of the injection nozzle toward a position of the other end of the filter element on the axial line with respect to a direction orthogonal to the axial line.

14. A filter washing method of a filtration apparatus,
the filtration apparatus including:
a casing that is partitioned into a fluid inflow chamber including a first port, through which a target fluid flows in from the outside, and a filtration chamber configured to filter the target fluid and including a second port through which a filtered fluid after filtration flows out to the outside; and
a filter element arranged in the filtration chamber and formed with one end and another end in a cylindrical shape, the filter element being configured to filter the target fluid guided from the fluid inflow chamber, which is connected to communicate with the one end, in such a manner that the target fluid passes in a direction from an inner circumferential surface toward an outer circumferential surface, and to block an outflow of the target fluid from the other end toward the second port,
the method comprising:
performing backwashing by drawing the filtered fluid in a direction from the outer circumferential surface toward the inner circumferential surface of the filter element;
performing high-pressure washing by injecting a high-pressure fluid so as to pass through the filter element in the direction from the inner circumferential surface toward the outer circumferential surface of the filter element; and
rotating a mechanism for performing the backwashing and a mechanism for performing the high-pressure washing around an axial line of the filter element in an internal space of the filter element communicating with the fluid inflow chamber, during the backwashing and the high-pressure washing, wherein
the mechanism for performing the high-pressure washing includes: a movable cylinder that is movable in the direction of the axial line and is rotatable around the axial line; a piston rod including a piston portion, which is accommodated in the movable cylinder and is not movable in the direction of the axial line, and two fluid supply paths that supply the high-pressure fluid to a first fluid chamber and a second fluid chamber, which are partitioned in the internal space of the movable cylinder by the piston portion, from the outside, respectively; and a plurality of injection nozzles that are provided in the movable cylinder to inject the high-pressure fluid in a state in which one or more of the injection nozzles communicate with the first fluid chamber, and the other one or more of the injection nozzles communicate with the second fluid chamber, and the high-pressure washing mechanism is configured such that the movable cylinder is configured to reciprocate in the direction of the axial line by sequentially switching the fluid supply path that supplies the high-pressure fluid out of the two fluid supply paths, and
a moving speed of the movable cylinder is reduced by supplying some of the high-pressure fluids from one fluid supply path, which supplies the high-pressure fluid, out of the two fluid supply paths to the other fluid supply path.

15. A filter washing method of a filtration apparatus, the filtration apparatus including:
a casing that is partitioned into a fluid inflow chamber including a first port, through which a target fluid flows in from the outside, and a filtration chamber configured to filter the target fluid and including a second port through which a filtered fluid after filtration flows out to the outside; and
a filter element arranged in the filtration chamber and formed with one end and another end in a cylindrical shape, the filter element being configured to filter the target fluid guided from the fluid inflow chamber, which is connected to communicate with the one end, in such a manner that the target fluid passes in a direction from an inner circumferential surface toward an outer circumferential surface, and to block an outflow of the target fluid from the other end toward the second port,
the method comprising:
performing backwashing by drawing the filtered fluid in a direction from the outer circumferential surface toward the inner circumferential surface of the filter element;
performing high-pressure washing by injecting a high-pressure fluid so as to pass through the filter element in the direction from the inner circumferential surface toward the outer circumferential surface of the filter element;
rotating a mechanism for performing the backwashing and a mechanism for performing the high-pressure washing around an axial line of the filter element in an internal space of the filter element communicating with the fluid inflow chamber, during the backwashing and the high-pressure washing;
discharging a backwashing fluid, which is generated when the filtered fluid passes through the filter element by the backwashing, through the other end of the filter element; and
discharging a washing fluid, which is generated by the high-pressure washing, through the other end of the filter element, wherein
the mechanism for performing the high-pressure washing includes: a movable cylinder that is movable in the direction of the axial line and is rotatable around the axial line; a piston rod including a piston portion, which is accommodated in the movable cylinder and is not movable in the direction of the axial line, and two fluid supply paths that supply the high-pressure fluid to a first fluid chamber and a second fluid chamber, which are partitioned in the internal space of the movable cylinder by the piston portion, from the outside, respectively; and a plurality of injection nozzles that are provided in the movable cylinder to inject the high-pressure fluid in a state in which one or more of the injection nozzles communicate with the first fluid chamber, and the other one or more of the injection nozzles communicate with the second fluid chamber, and the high-pressure washing mechanism is configured such that the movable cylinder is configured to reciprocate in the direction of the axial line by sequentially switching the fluid supply path that supplies the high-pressure fluid out of the two fluid supply paths, and
the injection nozzle is inclined in a direction from a position of the injection nozzle toward a position of the other end of the filter element on the axial line with respect to a direction orthogonal to the axial line and injects the high-pressure fluid.

* * * * *